(12) United States Patent
Benkoski et al.

(10) Patent No.: US 11,660,835 B2
(45) Date of Patent: May 30, 2023

(54) INCOMPRESSIBLE MOISTURE-SCAVENGING ARTICLE

(71) Applicant: The Johns Hopkins University, Baltimore, MD (US)

(72) Inventors: Jason J. Benkoski, Catonsville, MD (US); Konstantinos Gerasopoulos, Odenton, MD (US); Steven M. Griffiths, Ellicott City, MD (US); Paul J. Biermann, Columbia, MD (US); Melanie L. Morris, Odenton, MD (US); Xiomara Calderon-Colon, Fulton, MD (US)

(73) Assignee: The Johns Hopkins University, Baltimore, MD (US)

( * ) Notice: Subject to any disclaimer, the term of this patent is extended or adjusted under 35 U.S.C. 154(b) by 210 days.

(21) Appl. No.: 16/940,628

(22) Filed: Jul. 28, 2020

(65) Prior Publication Data
US 2021/0094255 A1 Apr. 1, 2021

Related U.S. Application Data

(60) Provisional application No. 62/907,984, filed on Sep. 30, 2019.

(51) Int. Cl.
*B32B 3/18* (2006.01)
*B32B 3/30* (2006.01)
(Continued)

(52) U.S. Cl.
CPC ............ *B32B 3/18* (2013.01); *A41D 19/0006* (2013.01); *A41D 31/125* (2019.02); *B32B 3/30* (2013.01);
(Continued)

(58) Field of Classification Search
CPC .... B32B 3/18; B32B 3/30; B32B 5/02; B32B 5/26; B32B 7/06; B32B 7/12; B32B 25/10; B32B 27/12; B32B 27/308; B32B 37/185; B32B 2255/10; B32B 2262/0253; B32B 2262/0261; B32B 2305/026; B32B 2307/304; B32B 2307/546; B32B 2307/724; B32B 2307/7265; B32B 2307/73; B32B 2307/734; B32B 2307/748; B32B 2319/00; B32B 2323/00; B32B 232/18; B32B 2377/00; B32B 2437/02; B32B 2327/18; B32B 5/022; B32B 27/065; B32B 27/322; B32B 2255/02; B32B 2255/26; B32B 2262/0276; B32B 2266/126; B32B 2307/732; B32B 2437/00; B32B 5/024; B32B 5/245; A41D 31/125; A41D 13/002; A41D 13/012
(Continued)

(56) References Cited

U.S. PATENT DOCUMENTS

| 5,043,209 A * | 8/1991 | Boisse | B32B 27/32 442/403 |
| 2012/0276332 A1* | 11/2012 | Conolly | D06M 11/79 428/221 |

(Continued)

*Primary Examiner* — Matthew D Matzek
(74) *Attorney, Agent, or Firm* — Noah J. Hayward

(57) ABSTRACT

Articles and insulating systems include a wicking layer, an incompressible insulation layer, and a water scavenging system comprising a superhydrophobic layer in operative communication with one or more water collecting components.

19 Claims, 18 Drawing Sheets

(51) Int. Cl.
- B32B 27/30 (2006.01)
- B32B 7/06 (2019.01)
- B32B 5/26 (2006.01)
- B32B 7/12 (2006.01)
- B32B 25/10 (2006.01)
- B32B 27/12 (2006.01)
- B32B 37/18 (2006.01)
- A41D 31/12 (2019.01)
- A41D 19/00 (2006.01)
- B32B 5/02 (2006.01)

(52) U.S. Cl.
CPC ............... *B32B 5/02* (2013.01); *B32B 5/26* (2013.01); *B32B 7/06* (2013.01); *B32B 7/12* (2013.01); *B32B 25/10* (2013.01); *B32B 27/12* (2013.01); *B32B 27/308* (2013.01); *B32B 37/185* (2013.01); *B32B 2255/10* (2013.01); *B32B 2262/0253* (2013.01); *B32B 2262/0261* (2013.01); *B32B 2305/026* (2013.01); *B32B 2307/304* (2013.01); *B32B 2307/546* (2013.01); *B32B 2307/724* (2013.01); *B32B 2307/7265* (2013.01); *B32B 2307/73* (2013.01); *B32B 2307/734* (2013.01); *B32B 2307/748* (2013.01); *B32B 2319/00* (2013.01); *B32B 2323/00* (2013.01); *B32B 2327/18* (2013.01); *B32B 2377/00* (2013.01); *B32B 2437/02* (2013.01)

(58) Field of Classification Search
USPC ............... 428/91; 2/458; 442/79, 85, 86
See application file for complete search history.

(56) References Cited

U.S. PATENT DOCUMENTS

| | | | |
|---|---|---|---|
| 2017/0143059 A1* | 5/2017 | Gallagher | A41B 11/005 |
| 2018/0084853 A1* | 3/2018 | Markesbery | B32B 27/281 |

* cited by examiner

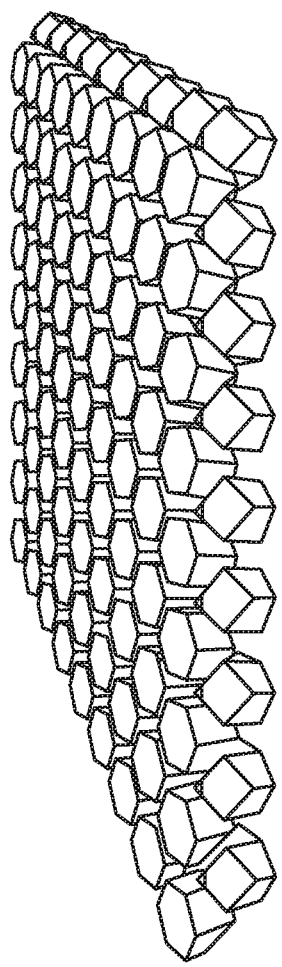
FIGURE 2B stretched 40%
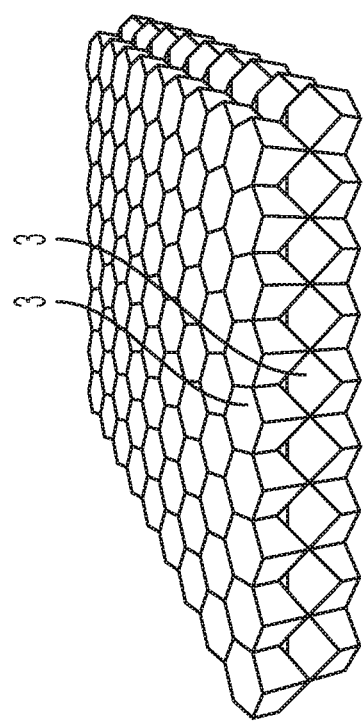
FIGURE 2A flat
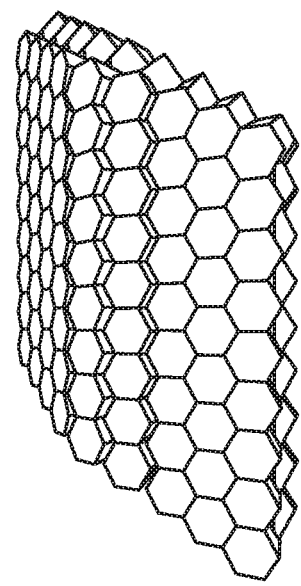
FIGURE 2E rotate 60°
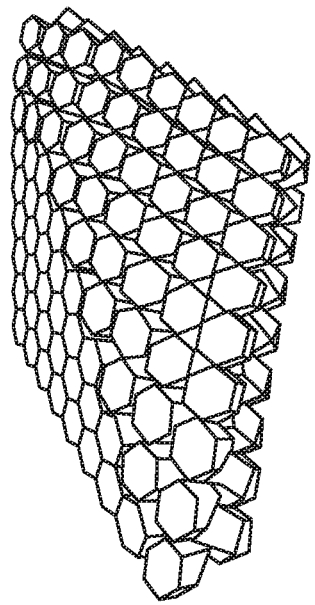
FIGURE 2D rotate 30°
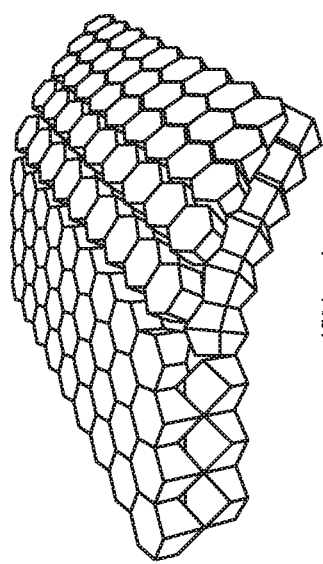
FIGURE 2C 45° bend

INCOMPRESSIBLE MOISTURE-SCAVENGING ARTICLE

CROSS-REFERENCE TO RELATED APPLICATIONS

This application claims priority to and the benefit of prior-filed, U.S. Provisional Application Ser. No. 62/907,984, filed Sep. 30, 2019, the content of which is herein incorporated by reference in its entirety.

STATEMENT OF GOVERNMENTAL INTEREST

This invention was made with Government support under contract number N00014-16-1-2592 awarded by the Office of Naval Research (ONR). The Government has certain rights in the invention.

BACKGROUND

Hypothermia remains an unsolved problem for cold water diving and other activates in cold environments. With regard to water diving, for example, a standard dry suit in 40° F. water, intermittent shivering begins within 60-90 minutes, followed by uncontrollable shivering after 90-120 min. As the fingers, hands, and arms cool below 60° F., divers suffer lost reaction time, tracking proficiency, manual dexterity, tactile discrimination, kinesthetic sensation, and muscle strength.

Removing heat 25 times faster than air, cold water presents an enormous insulation challenge. Modern dry suits use either rubber foam or fibrous undergarments to prevent heat loss. However, foamed rubber compresses at greater depths, which negating its benefits. At a depth of 100 feet under water, for example, foamed rubber loses heat at about 4 times faster than at the surface of the water (e.g., not submerged under water). Insulating undergarments better resist compression, but undesirably add bulk. Paired with a stiff GORE-TEX® shell, insulating undergarments undesirable wrinkle under water to form folds that reduce the range of motion, and add significant drag.

BRIEF SUMMARY

Certain example, non-limiting embodiments of the invention include an article (e.g., an insulating article) having a wicking layer, an incompressible insulation layer, and a water scavenging system comprising a superhydrophobic layer in operative communication with one or more water collecting components. The article may include an exterior fibrous fleece that reduces the rate of radiative heat loss.

Other example embodiments include an insulating system including a wicking layer, an incompressible insulation layer, and a water scavenging system comprising a superhydrophobic layer in operative communication with one or more water collecting components. The insulating system may include an exterior fibrous fleece that reduces the rate of radiative heat loss.

In another aspect, example embodiments include a method of forming an insulating article. The method may include providing or forming a wicking layer, and directly or indirectly overlying the wicking layer with an incompressible insulation layer. The method may also include providing or forming a water scavenging system comprising a superhydrophobic layer in operative communication with one or more water collecting components.

BRIEF DESCRIPTION OF THE DRAWINGS

Some non-limiting, example embodiments will now be described more fully hereinafter with reference to the accompanying drawings, in which some, but not all, embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout, and wherein:

FIGS. 2A-2E illustrate an incompressible insulation having a double-layer structure that includes a first layer of individually tiled aerogel components and a second layer of individually tiled aerogel components;

DETAILED DESCRIPTION

Figure 1A:
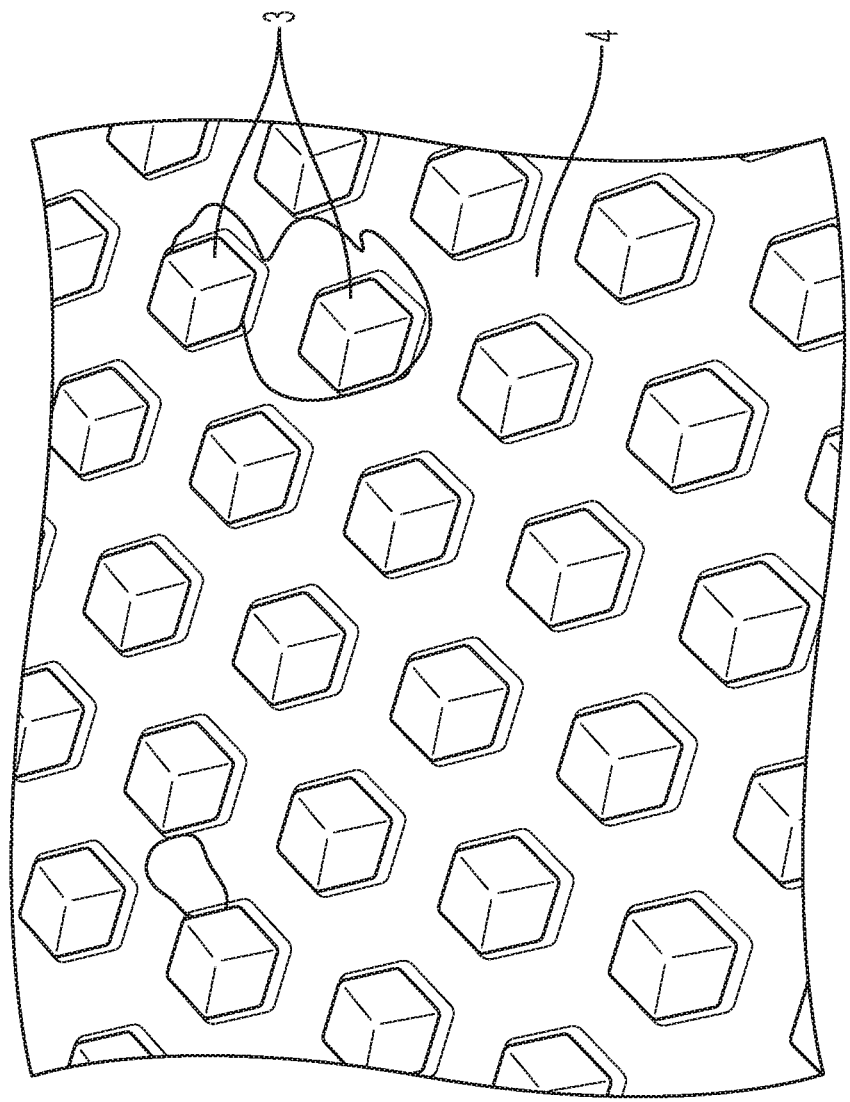
FIGS. 1A and 1B each illustrate a plurality of individually tiled polymer aerogel components adhered to a flexible substrate.

Some example embodiments of the invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Example embodiments of the present invention relate generally to articles, such as insulating articles, that may be wearable by a user in accordance with certain embodiments of the invention. For instance, the article may be provided in a variety of flexible configurations (e.g., gloves, masks, pants, footwear, shirts, etc.) that may be worn by a user while undertaking a variety of tasks (e.g., underwater diving, skiing, etc.). In accordance with certain embodiments of the invention, for instance, the article may keep a user or a part of a user's body (e.g., a hand) warm and dry in extremely cold environment. For example, the article may have a thermal conductivity of about 0.01-0.05 W/m-K thermal conductivity, such as at least about any of the following: 0.01, 0.02, and 0.03 W/m-K and/or at most about any of the following: 0.05, 0.04, and 0.03 W/m-K.

In accordance with certain embodiments of the invention, the article includes a combination of layers that provide a combination of desirable features. For instance, the articles provide a robust level of thermal insulation by, at least in part, including at least one insulation layer that is incompressible (e.g., compresses in a z-direction by less than about 10%, less than about 5%, less than about 3%, less than about 1%, or less then about 0.1% when placed under a pressure of <150 pounds-per-square inch) in accordance with certain embodiments of the invention. The incompressible nature of the insulation layer, in accordance with certain embodiments of the invention, mitigates the loss of thermal insulation associated with compressible insulting materials (e.g. foamed materials) when used in increased pressure applications, such as in a dry suit for deep sea diving applications in which compressible insulating materials become flattened with increased pressure and begin to significantly loose thermal insulating properties.

The insulating layer may include a layer of individually tiled aerogels bonded on to a flexible substrates (e.g., film, fabric, or combination thereof). In accordance with certain embodiments of the invention, the individually tiled aerogels may each have varying dimensions to accommodate desired dexterity of flexibility in the final article. For instance, a glove including an insulation layer as disclosed and described herein may include a first group of individual aerogel tiles located on the top portion (e.g., the area proximate or overlying the back of a user's hand) having a larger x-dimension and a larger y-dimension as compared to a second group of individual aerogel tiles located on the underneath portion (e.g., the area proximate or overlying a user's palm or underside of a user's knuckle). In this regard, the overall shape of the individual aerogel tiles may vary throughout the article to facilitate proper use of the article when being worn by a user. That is, the individually tiled aerogels may be patterned onto a supporting substrate (e.g., flexible substrate) in a manner to impart improved thermal insulation while not significantly sacrificing the flexible nature of the resulting article (e.g., flexible glove with individually bendable fingers, etc.). In accordance with certain embodiments of the invention, the incompressible insulation layer may provide thermal insulation that is, for example, from about 1.5-2 times better than existing thermal insulation materials, such as THINSULATE® (available from 3M Company), at sea level. Since typical thermal insulation, such as THINSULATE®, are primarily filled with air, the individually tiled polymer aerogels may, therefore, thermally insulate from 6-8 times better at a depth of 100 ft., where the pressure is 4 times higher than at sea level.

In accordance with certain embodiments of the invention, the individual tiled aerogels may include one or more polymer aerogels. In this regard, the largest source of heat loss in diving applications, for instance, is the conduction of heat away from the body into water. Polymer aerogels are among the best thermal insulators and may include a thermal conductivity from about 0.01 W/m-K to about 0.05 W/m-K, such as at least about any of the following: 0.01, 0.02, and 0.03 W/m-K and/or at most about any of the following: 0.05, 0.04, and 0.03 W/m-K. Aerogels have an open pore structure and may include from about 95% air with an average size pore size of about 20 nm. For example, approximately 50% of the pores may be smaller than 100 nm, ranging all the way down to full contact. The dendritic branch-like structure of the material results in a tortuous path for heat conduction. Thermal phonons become trapped in dead ends, making it possible for the thermal conductivity of a solid aerogel to be even lower than gaseous air. Such structures have massive specific surface areas, ranging from 400-1000 $m^2/g$, such as from at least about any of the following: 400, 500, 600, and 700 $m^2/g$ and/or at most about any of the following: 1000, 900, 800, and 700 $m^2/g$. Unlike silica aerogels, polymer aerogels are not brittle. Polymer aerogels, in accordance with certain embodiments of the invention, for example may have a crush strength of 290 psi (20 atm) or more. Moreover, polymer aerogels fail much more gracefully than silica by merely densifying into a translucent polymer under heavy loads, rather than crumble or generate irritating powders.

In addition to the use of at least one insulation layer that is incompressible, the article also includes a wicking layer that when worn by a user would be proximate to or adjacent to a user's skin (e.g., a lining layer). In accordance with certain embodiments of the invention, the wicking layer collects moisture from air and/or skin of a user and shuttles it away from the user's skin. In this regard, a user's body may begin to sweat while wearing the article during use as an attempt to naturally cool the user's body. The wicking layer, for example, helps pull the moisture (e.g., sweat) away from the user's skin via capillary action. In accordance with certain embodiments of the invention, the moisture (e.g., sweat) may be wicked away from the user's skin and into a porous structure of the wicking layer in which the increased surface area associated with the porous structure within the body of the wicking layer facilitates at least partially evaporation of the moisture (sweat). In this regard, the article also includes a water scavenging system comprising a superhydrophobic layer in operative communication with one or more water collecting components. In accordance with certain embodiments of the invention, the water vapor (e.g., evaporated sweat) is allowed to travel through the wicking layer and come into contact with a superhydrophobic layer that is located distal to the user's skin in comparison to the wicking layer. In this regard, the water vapor strikes the superhydrophobic layer, which is cooler than the wicking layer, and condenses back into a liquid state. The condensate forms on the superhydrophobic layer in a form of beads that may roll or flow across the surface of the superhydrophobic layer towards one or more water collecting components (e.g., a hydrogel, superabsorbent polymer, etc.). In this regard, the article may pull liquid moisture (e.g., sweat) away from a user and collect it in liquid form in a manner such that the condensate is isolated and does not rewet the article, which would detract from the article's thermal insulation properties. Until now, sweat has only been removed from winter gear by allowing it to evaporate through the clothing, however, this is not a viable option for diving suits. The water scavenging system, in accordance with certain embodiments of the invention, may be especially useful for diving applications, but may also find utility on land. In accordance with certain embodiments of the invention, the water scavenging system may scavenge moisture (e.g., pull away from a user's skin and collect condensate) nearly as fast as an adult male can sweat.

In accordance with certain embodiments of the invention, the article may also include one or more vapor permeable liquid barrier layers that is permeable to vapor (e.g., evaporated water) but impermeable to liquid (e.g., sweat). The one or more vapor permeable liquid barrier layers may be external with respect to the wicking layer, such that the wicking layer is located closer to a user's skin when the article is in use. The one or more vapor permeable liquid barrier layers enable the article to move evaporated moisture outwardly through the article while preventing liquid moisture from traveling in any direction across the one or more vapor permeable liquid barrier layers. In this regard, the article effectively provides a one-way movement through the thickness of the article (e.g., away from a user's skin) as the one or more vapor permeable liquid barrier layers effectively function as a one-way valve within the article.

In accordance with certain embodiments of the invention, the article may also include a fleece layer located distally from a user's skin in comparison to the wicking layer. For example, the fleece layer may be an external layer or located immediately within an outermost liquid impermeable shell layer (e.g., rubber). The fleece layer, when present, may exploit a phenomenon observed in polar bears and penguins whereby fur or feathers emit infrared radiation in equilibrium with their environment. Since the tips of the fibers cool to ambient temperature, they emit infrared light at the same intensity as the surroundings. Being emissive, they absorb and emit infrared light at the same rate, resulting in no net radiative heat loss.

In accordance with certain embodiments of the invention, the article may include an insulating stack of layers that may be one or more of the following: thin, lightweight, bendable, stretchable, and incompressible. In accordance with certain embodiments of the invention, the article may be form-fitting like a wet suit, but insulates like a space shuttle tile regardless of depth under water. Moreover, the article significantly reduces or eliminates radiative heat loss with a fibrous fleece and/or shuttles moisture away from a user and captures it in a manner that does not negatively impact the thermal insulation properties of the article.

The invention provides, in accordance with certain embodiments of the invention, an article (e.g., a flexible insulating article) comprising the combination of a wicking layer, an incompressible insulation layer, and a water scavenging system comprising a superhydrophobic layer in operative communication with one or more water collecting components. In accordance with certain embodiments of the invention, the article can include a stack of such layers, in which each layer may be at least partially attached to an adjacent layer. In accordance with certain embodiments of the invention, one or more of the layers may simply be overlaid with respect to one another and not bonded or attached to any other layer. In such embodiments, for example, a user may easily add, remove, or substitute other material layers at ease.

In accordance with certain embodiments of the invention, the wicking layer may be located as an innermost layer of the article. For instance, the wicking layer may be in direct contact with a user's skin when worn by a user. The wicking layer may include a hydrophilic material to facilitate the uptake or wicking of moisture, such as sweat, from the surface of a user's skin. For example, the wicking layer may include a hydrophilic fabric. The hydrophilic fabric may be formed from fibers, threads, or yarns of naturally hydrophilic materials or the hydrophilic fabric may be formed from generally non-hydrophilic fibers, threads, or yarns that have been treated with a hydrophilic composition or compound to render the fabric hydrophilic. In accordance with certain embodiments of the invention, the wicking layer includes a plurality of pores defined by a plurality of fibers forming wicking layer. For example, the wicking layer may include a fabric with the ability to pull moisture away from the skin of a user via, at least in part, capillary action of built-in capillaries associated with the porous nature of the fabric. As moisture (e.g., sweat) is drawn into and through the wicking layer, the increased surface area associated with the plurality of pores facilitates evaporation of the moisture (e.g. sweat).

The wicking layer, in accordance with certain embodiments of the invention, may include a woven fabric, a nonwoven fabric, or a combination thereof. The wicking layer may be formed from a variety of materials including, but not limited to polyolefins, polyesters, polyamides, and natural fibers).

In accordance with certain embodiments of the invention, the wicking layer may include a thickness (e.g., shortest dimension of the wicking layer) from about 3 mm to about 0.3 mm, such as at most about any of the following: 3, 2.75, 2.5, 2.25, 2, 1.75, 1.5, 1.25, 1.0, 0.75, and 0.5 mm and/or at least about any of the following: 0.3, 0.4, 0.5, 0.75, 1.0, 1.25, 1.5, 1.75, and 2.0 mm.

Figure 1B:
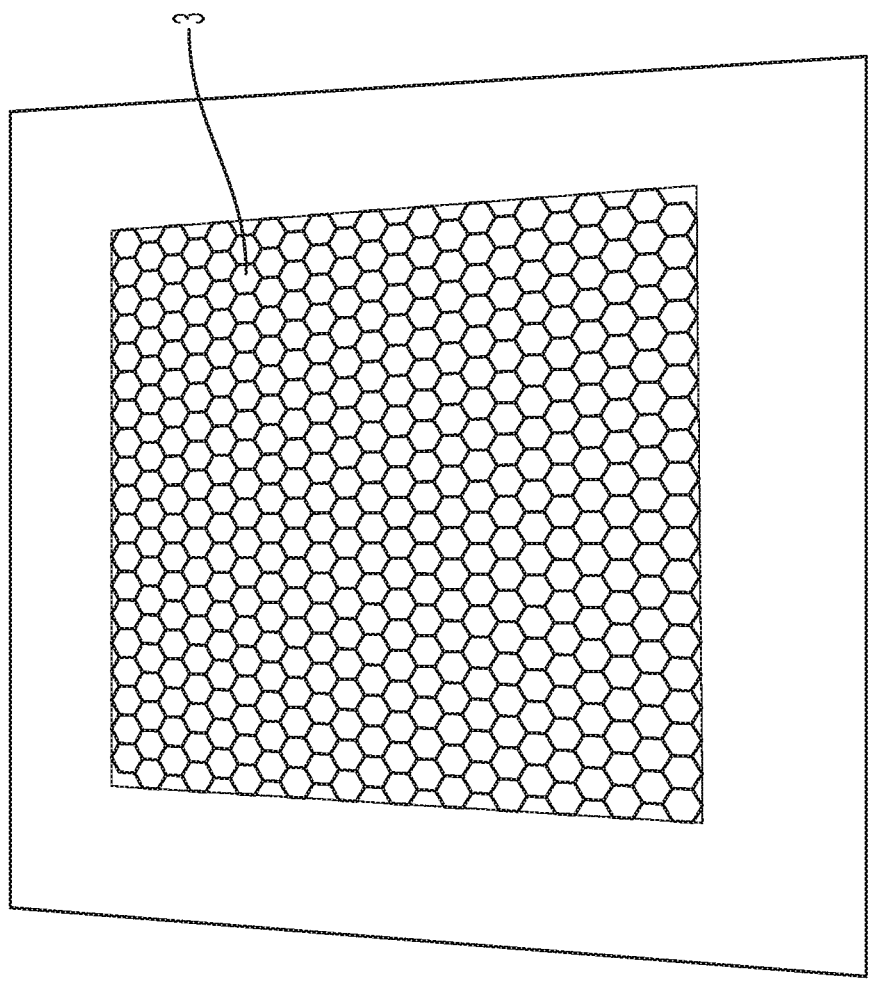

In accordance with certain embodiments of the invention, the incompressible insulation layer includes at least one aerogel layer comprising a plurality of individually tiled aerogel components adhered to at least one flexible substrate. For instance, the insulation layer may include 1, 2, 3, 4 or more layers of individually tiled aerogel components. FIGS. 1A and 1B show a plurality of individually tiled polymer aerogel components 3 adhered to a flexible substrate 4. The spacing between the individually tiled polymer aerogel components 3 is less than that of the individually tiled polymer aerogel components 3 of FIG. 1B. The tighter packing of the individually tiled polymer aerogel components 3 of FIG. 1B may be more beneficial for articles or portions of articles that do not require a great level of flexibility (e.g., portion of a glove covering the back of a user's hand). In this regard the packing density of the individually tiled polymer aerogel components may vary depending, at least in part, of desired degree of flexibility required by the final article. With regard to the formation of the individually tiled polymer aerogel components, the first step is to machine individual tiles from a monolithic block of insulating aerogel in accordance with certain embodiments of the invention. The second step, for example, may include adhering these individual tiles to a flexible substrate (e.g., fabric). As the fabric bends and stretches, it allows the insulating layer of individually tiled aerogel components to stretch with the flexible substrate (e.g., fabric).

Figure 2F:
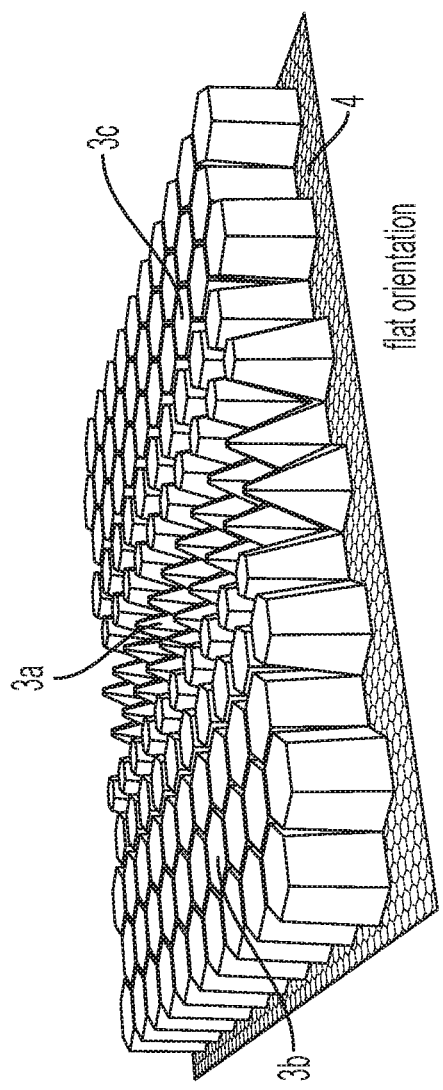
FIGS. 2F-2H illustrate an incompressible insulation having a single-layer structure that includes only a first layer of individually tiled aerogel components, in which the geometrical configuration of the individual tiled aerogel components vary from a first region to a second region and third region to impact greater flexibility via the first region.
Figure 2H:
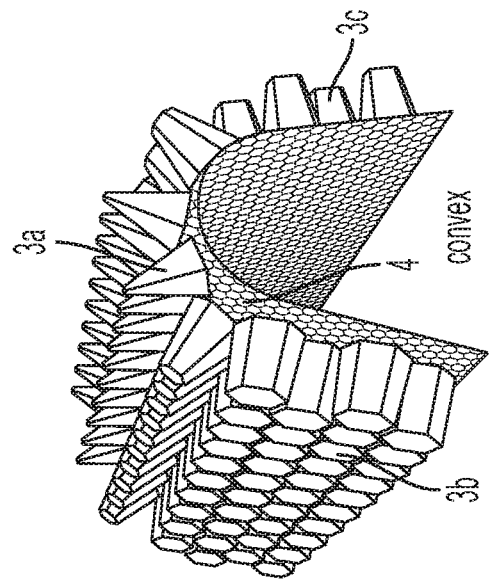
Figure 2G:
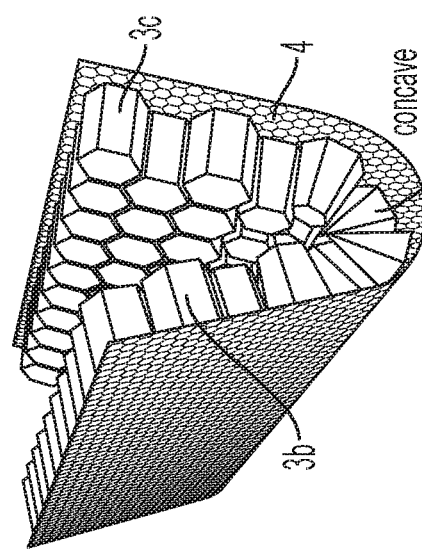

By way of example, only, the incompressible insulation layer may include a first layer of individually tiled aerogel components and a second layer of individually tiled aerogel components overlying the first layer of individually tiled aerogel components. FIG. 2A-2 E illustrate an incompressible insulation layer including a first layer 5 of individually tiled aerogel components and a second layer 6 of individually tiled aerogel components, wherein the first layer and the second layer include individually tiled aerogel components each having a trigonal pyramid with a hexagonal base that fills open space when stacked in opposing arrays as shown in FIGS. 2A-2E. As shown in FIGS. 2A-2E, the array stretches gracefully, and it bends equally well for virtually all rotations of the bending axis. In accordance with certain embodiments of the invention, the incompressible insulation layer may be referred to as a bilayer of mating hexagonal space-filling arrays. FIGS. 2F-2H illustrate an incompressible insulation having a single-layer structure that includes only a first layer of individually tiled aerogel components, in which the geometrical configuration of the individual tiled aerogel components vary from a first region 3a to a second region 3b and third region 3c to impact greater flexibility via the first region. As shown in FIG. 2F-2H, the individually tiled aerogel components of the first region 3a have base portion adhered to the flexible fabric that is noticeably larger than an outwardly facing portion (e.g., similar to a pyramid or truncated pyramid) to form a region of greater flexibility of an article.

The strength of the individually tiled aerogel components may be considered under two conditions: uniaxial compression and isostatic pressure. The former relates to being stepped on, while the latter relates to operation at depth (e.g., when diving underwater). Thus, the maximum load will be the weight of an average adult male, approximately 200 pounds, the maximum palmar grip strength of an adult male is typically 141 pounds (100 psi), and the maximum pressure is that experienced at a depth of 100 ft., about 59 psi. A crush strength of 100 psi is sufficient to meet these criteria. In this regard, the individually tiled aerogel components may include a crush strength of at least about 100 psi to about 500 psi, such as at least about any of the following: 100, 200, and 300 psi, and/or at most about any of the following: 500, 400, and 300 psi. For instance, a crush strength of 100 psi is enough to withstand the weight of being stepped on (200 pounds spread out over 2 square inches).

Figure 3B:
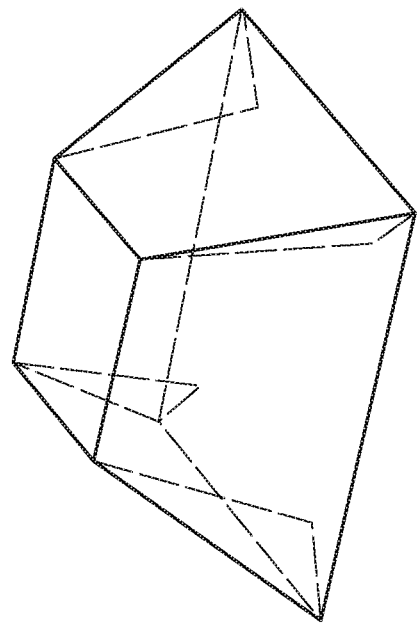
FIGS. 3A-3C illustrate non-limiting examples of geometric shapes of individual aerogels having one or more non-perpendicular side walls.
Figure 3A:
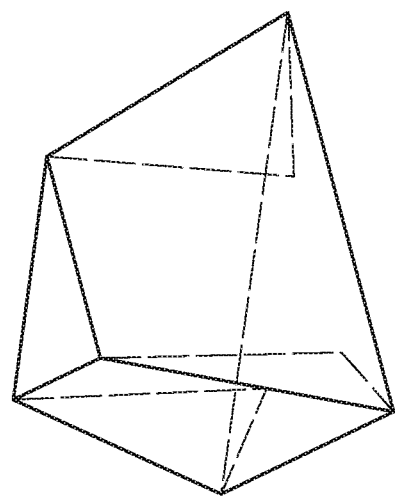
Figure 3C:
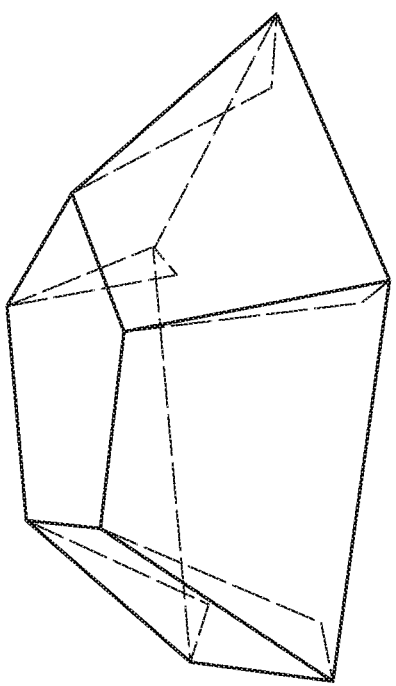

In accordance with certain embodiments of the invention, the individually tiled aerogel components may have an average thickness in the z-direction (e.g., shortest dimension) from about 0.1 to about 2 mm, such as about any of the following: 0.1, 0.2, 0.3, 0.4, and 0.5 mm, and/or at most about any of the following: 2, 1.8, 1.5, 1.2, 1, 0.9, 0.8, 0.7, 0.6, and 0.5 mm. The individually tiled aerogel components, in accordance with certain embodiments of the invention, may include a first individual aerogel having side edges perpendicular to a first outer surface and a second outer surface, and a second individual aerogel having one or more side edges angled from a first outer surface to a second outer surface (pyramid or truncated pyramid). For example, the second individual aerogel having the angled side wall or side walls may be located in the article where increased flexibility is desired, such as on a palm portion or underneath a knuckle portion of a glove. FIGS. 3A-3C illustrate non-limiting examples of geometric shapes of individual aerogels having one or more non-perpendicular side walls. FIG. 3A, for instance, illustrates a truncated triangular pyramid. FIG. 3B illustrates a truncated square pyramid. FIG. 3C illustrates a truncated pentagonal pyramid. In accordance with certain embodiments of the invention, the truncated pyramid structure may include from about 3 to about 10 side edges at the base of the truncated pyramid structure. When the article is provided as a glove, for example, the individually tiled aerogel components on the inside of each finger have a greater taper to facilitate bending while the tiled aerogel components near the top of the palm are rectangular rather than hexagonal to facilitate bending. In accordance with certain embodiments of the invention, the fingers of the glove are shorter relative to the palm, so that the most highly tapered tiled aerogel components have better registry with the knuckles.

In accordance with certain embodiments of the invention, the individually tiled aerogel components may include a polymer aerogel. Polymer aerogels may include a cross-linked polymer having a highly porous body with a plurality of small pores (e.g., from 10 to 50 nanometers om average). In accordance with certain embodiments of the invention, the polymer aerogels may include polyurethanes, polyureas, polyamides, polyimides, polyesters, other condensation polymers, and any combinations thereof.

In accordance with certain embodiments of the invention, the individually tiled aerogel components may include an average cross-section in the x-y plane from about 1 $mm^2$ to about 2500 $mm^2$, such as at least about any of the following: 1, 10, 25, 50, 75, 100, 150, 200, 250, 500, 750, and 1000 $mm^2$, and/or at most about any of the following: 2500, 2250, 2000, 1750, 1500, 1250, and 1000 $mm^2$. In accordance with certain embodiments of the invention, for example only, the article may include a body suit and one or more (or overall average) of the tiled aerogel components may have a cross-section in the x-y plane from 1000 to 2500 $mm^2$ while a glove may fall more in the range from 1 to 100 $mm^2$.

The incompressible insulation layer, in accordance with certain embodiments of the invention, may include at least one layer (e.g., a single layer) of individually tiled aerogel components located between a first flexible substrate and second flexible substrate. For example, the at least one layer (e.g., a single layer) of individually tiled aerogel components may be adhered to one or both of the flexible substrates. One or both of the flexible substrates may include a vapor permeable liquid barrier layer. In this regard, for example, the evaporated moisture may be free to pass through the insulation layer as the individually tiled aerogel components provide channels therebetween that allow evaporated moisture to pass through the tiled aerogels while the evaporated moisture is free to pass through the vapor permeable liquid barrier layer.

In accordance with certain embodiments of the invention, the first flexible substrate and second flexible substrate (if present) may independently be selected from different forms of vapor permeable liquid barrier layers. For example, one or both (if present) of the flexible substrates may include a fabric (e.g., nonwoven, or hydrophobic-treated fabric), a microporous film (e.g., film including a plurality of small pores that enable the passage of vapor but prevent the passage of liquid), a monolithic film, or any combination thereof. For example, the vapor permeable liquid barrier layer(s) may include a stretched polytetrafluoroethylene (PTFE), e.g., TEFLON®. The vapor permeable liquid barrier layers may include a monolithic film, which is continuous and free of pores. In this regard, monolithic films are capable of absorbing gas and water molecules on one surface, transferring the molecules through the film, and releasing the molecules on the opposite surface. Monolithic films have an advantage over microporous films in that the monolithic film's ability to serve as a liquid barrier is independent of the surface tension of the liquid to which the film is exposed. In accordance with certain embodiments of the invention, the vapor permeation rate should may be at least 600 g/m$^2$-hr, which corresponds to the maximum sweat rate of an adult male under heavy exertion. Conversely, the permeable layer should withstand the penetration of water down to a depth of about 100 ft. The vapor permeation rate, for example, may be from 200 to 1000 g/m$^2$-hr, such as at least about any of the following: 200, 300, 400, 500, and 600 g/m$^2$-hr, and/or at most about any of the following: 1000, 900, 800, 700, and 600 g/m$^2$-hr.

The article, in accordance with certain embodiments of the invention, include a water scavenging system comprising a superhydrophobic layer in operative communication with one or more water collecting components. The superhydrophobic layer of the water scavenging system, for example, may include a superhydrophobic coating located on a water impermeable substrate (e.g., a flexible rubber, flexible and liquid impermeable fabric or film). By way of example, when the article is provided in the form of a glove or other wearable article the evaporated moisture (e.g., sweat) contacts the superhydrophobic layer, which may be located distally from the user's skin in comparison to the wicking layer, and condenses due to the relatively colder nature of the superhydrophobic layer being located at or closer to the external environment (e.g., cold air, cold water, etc.). In accordance with certain embodiments of the invention, the water condenses and the superhydrophobic coating provides frictionless transport of the droplets to a condensate collector, which may be located within various locations of the article (e.g., between or incorporated into individual layers of the article or external to the individual layers of the article (e.g., a band configured to be worn around a user's wrist may include the water collecting component(s)).

Figure 4:
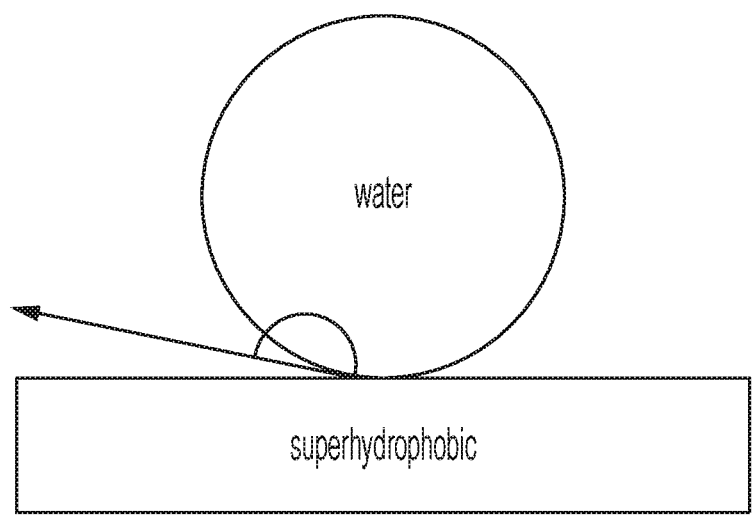
FIG. 4 illustrates the contact angle for a superhydrophobic layer.

The superhydrophobic layer may, for example, include a coating on the inside of the insulating layer upon which water condenses or the inside of a fleece layer or the inside of an outer liquid impermeable shell. The surface temperature of the superhydrophobic layer will always be lower than that of the water-saturated air near the user's skin, and it will thus be a nucleating surface for condensation. The superhydrophobic layer may include an exceedingly high water contact angle (e.g., >140°, >150°, >160°) provides nearly frictionless movement of droplets towards a sponge-like water collecting component (e.g., which may be provided near a user's wrists, waist, ankles, etc.). The superhydrophobic layer may include a surface layer that repels water in which droplets of water hitting this layer may fully rebound. As noted above, the contact angle of water droplets on the superhydrophobic layer may exceed about 140°, 145°, 150°, 155°, 160°, or 165°. FIG. 4 illustrates the contact angle for a superhydrophobic layer. The superhydrophobic layer may, for example, include a spray-painted layer of TEFLON® nanoparticles on, for example, a styrene-ethylene-butylene-styrene (SEBS) backing. Such a configuration, also has the flexibility to stretch with the article. A superhydrophobic material, in accordance with certain embodiments of the invention, may be made out of any polymer with a water contact angle greater than 90° and surface roughness simultaneously over both the nanoscale (<100 nm) and 10-30 μm. Besides fluoropolymers, polyolefins such as polyethylene, polypropylene, and various hybrids are suitable in accordance with certain embodiments of the invention.

In accordance with certain embodiments of the invention, dryness may be achieved through a water scavenging system including a superhydrophobic layer located on the inside of the article but externally located from the wicking layer. For instance, the moisture-wicking layer pulls sweat away from the user's skin and enhances evaporation by increasing the surface area. Secondly, water vapor passes through at least one vapor permeable liquid barrier layer (e.g., a porous TEFLON® membrane that acts like a one-way valve by allowing water vapor to pass towards the superhydrophobic layer, but prevents liquid water from returning to the skin). Finally, the vapor condenses on the superhydrophobic layer that efficiently shuttles the droplets to a water collection component (e.g., a reservoir).

In accordance with certain embodiments of the invention, the superhydrophobic layer may include one or more channels operatively connected to the one or more water collecting components. In this regard, the condensate may be channeled more directly to the water collecting component (s) by confining the condensed droplets within one or more channels that direct the droplets to one or more water collecting components. In accordance with certain embodiments of the invention, the one or more water collecting components may be located between the incompressible insulation layer and the superhydrophobic layer. In accordance with certain embodiments of the invention, the one or more water collecting components may be located between the incompressible insulation layer and the wicking layer. Additionally or alternatively, the one or more water collecting components may be located outside of the individual layers (e.g., collecting components configured to be worn around a user's wrists, ankles, waist, etc.) and operatively connected to the superhydrophobic layer by one or more conduits. For example, the one or more water collecting components may be provided in the form of a circular band configured to be worn around an appendage of a user.

In accordance with certain embodiments of the invention, the one or more collecting components may include a water absorbing material comprising a superabsorbent polymer or a hydrogel. The water absorbing material, for example, may absorb from about 100 times to about 10,000 times its weight in water, such as at least about any of the following: 100, 200, 300, 500, 600, 800, 1000, 1500, 2000, 2500, 3000, and 5000 times its weight in water and/or at most about any of the following: 10,000, 8000, 7000, 6000, and 5000 times its weight in water. In accordance with certain embodiments of the invention, the water absorbing material may include a polyacrylic acid. In accordance with certain embodiments of the invention, the water absorbing material may include a crosslinked polyacrylamide, a poly(N-isopropyl acrylamide), a polystyrene sulfonate, a polyethyleneimine, a polyvinyl amine, a polyethylene oxide, any other hydrophilic polymer, and nay combinations thereof.

In accordance with certain embodiments of the invention, the one or more collecting components may include a liquid impermeable container housing the water absorbing material. In accordance with certain embodiments of the invention, the one or more collecting components may include a shape of a band that may be directly or indirectly worn by a user, which may be removable coupled directly or indirectly to the superhydrophobic layer.

In accordance with certain embodiments of the invention, the article may include a fleece layer of fine fibers that traps air and radiant heat against the surface of the article. In this regard, the fleece layer reduces radiative heat loss. Preventing infrared radiation, in accordance with certain embodiments of the invention, is beneficial since radiative heat loss becomes a proportionally larger fraction of the total heat loss as the insulation improves. Doing so has the added benefit of evading infrared cameras. To put radiant heat loss into perspective, the body loses 65% of its heat through radiation relative to 15% through convection to air.

In accordance with certain embodiments of the invention, the fibrous fleece layer can reduce the radiative heat loss by up to 100 W/m$^2$, such as at least by any of the following: 20, 40, 60, 80 and 100 W/m$^2$ and/or at most about up to 200, 180, 160, 140, 120, and 100 W/m$^2$. In order to match the infrared attenuation, the fibers must either perform reverse radiation, backscattering, or reflection of infrared light. For reverse radiation, theories suggest that each fiber acts like a blackbody, absorbing light from one direction, and then radiating it equally in all directions. For polymeric fleeces, the fleeces appear to radiate in accordance with their surface temperature, regardless of internal radiative heat transfer. Backscattering occurs when light scatters from each fiber/air interface. If enough scattering events are present, the light eventually scatters back towards the source. However, the fiber diameter must be comparable to the wavelength of light, and it must be fully transparent in the thermal infrared. The simplest method for attenuating radiative heat losses is to be reflective at infrared wavelengths. The fleece layer, for example, may be made of fibers that create a low emissivity surface. For instance, the fleece layer may include poorly conducting fibers in which the tips of the poorly conducting fibers equilibrate with the ambient temperature because of the standoff from the body. The ensuing reduction in infrared emission is significant, as the rate of heat loss scales with the fourth power of surface temperature. The fleece layer, for example, may include a plurality of polyolefin fibers (e.g., polypropylene), such as staple fibers (e.g., 2-10 mm in length, 3-6 mm in length, etc.). In this regard, the use of chopped or staple fibers may provide a greater fiber density than achievable via continuous fibers.

Figure 5:
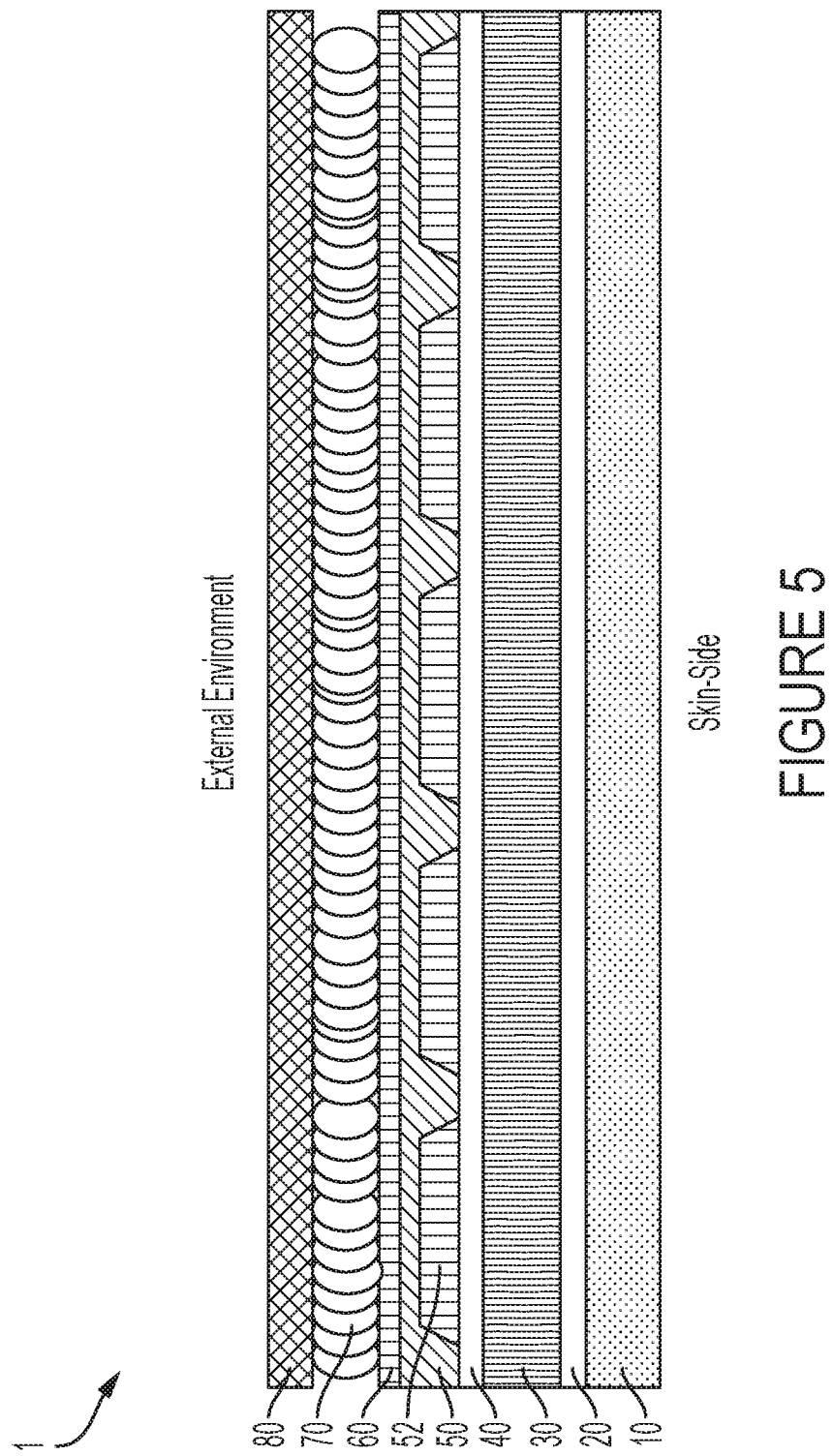
FIG. 5 illustrates an article including a wicking layer located adjacent to a user's skin in accordance with certain embodiments of the invention.

FIG. 5, for example, illustrates an article 1 including a wicking layer 10 located adjacent to a user's skin. Adjacent to the wicking layer 10 is a first flexible vapor-permeable liquid barrier layer 20. As shown in FIG. 5, the insulating layer 30 includes a plurality of individually tiled aerogel components. The insulation layer 30 is adhered to the first flexible vapor-permeable liquid barrier layer 20 and a second flexible vapor-permeable liquid barrier layer 40. A superhydrophobic layer 50 is disposed upon a flexible support/substrate 60. FIG. 5 illustrates an embodiment in which the superhydrophobic layer 50 includes one or more channels 52 that are operatively connected to one or more water collecting components (not shown in FIG. 5) that is located externally from the layers of the article. On the opposite side of the flexible support/substrate 60, the article includes a fleece layer 70. FIG. 5 also shows an optional outermost liquid impermeable shell (e.g., a rubber shell or the like) that may be used in, for example, diving applications.

Figure 6:
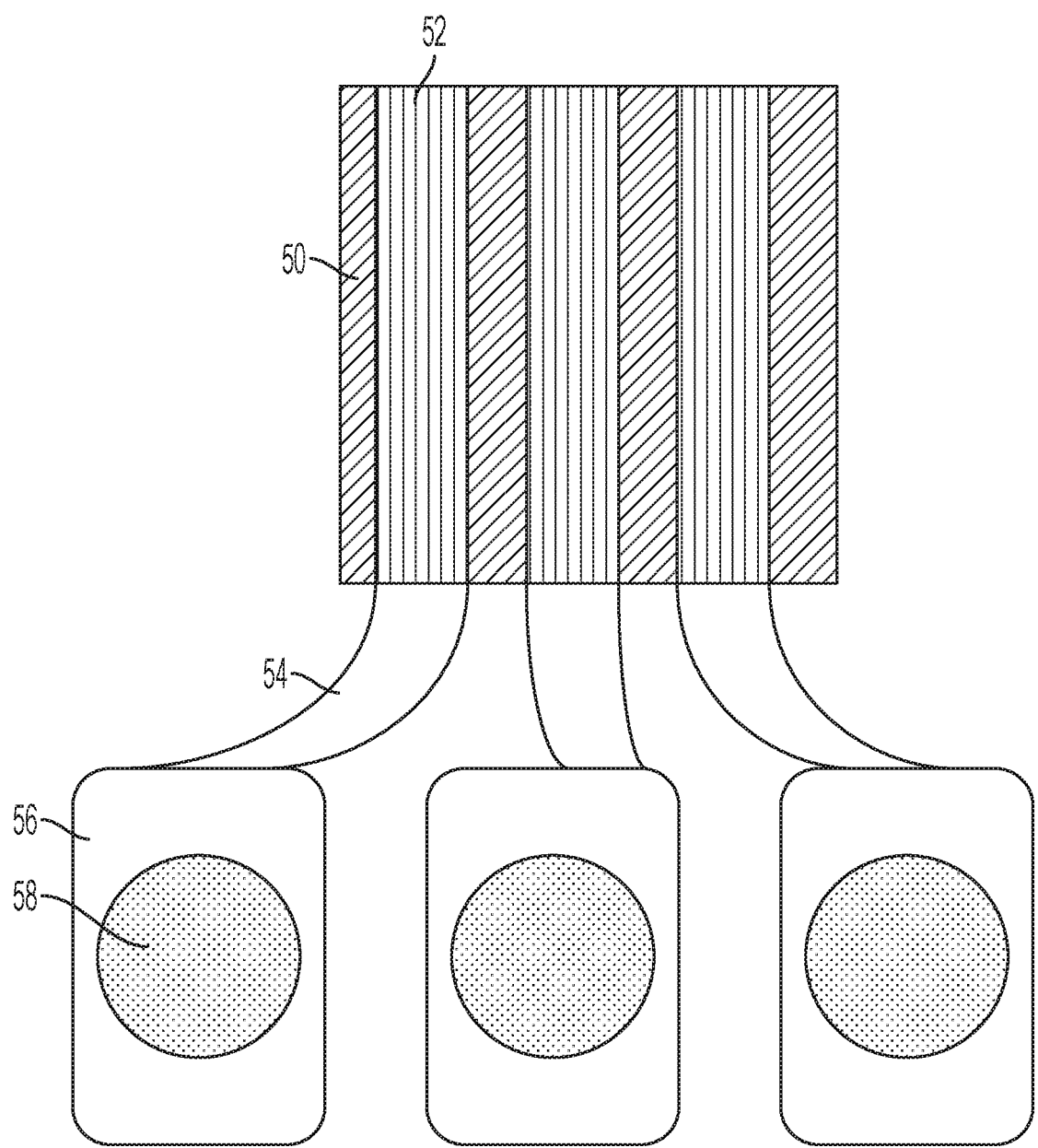
FIG. 6 illustrates a plan view of the superhydrophobic layer including channels that are operatively connected to one or more water collecting components via one or more conduits in accordance with certain embodiments of the invention.
Figure 7:
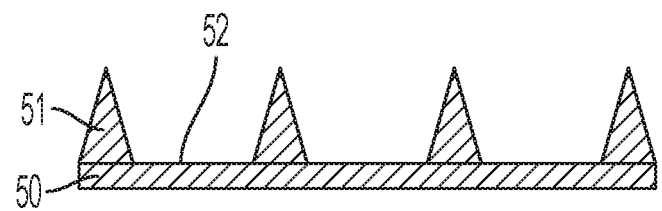
FIG. 7 illustrates a side view of the superhydrophobic layer including ridges, in which the superhydrophobic layer and the ridges define the channels that channel condensed water across the surface of the superhydrophobic layer.

FIG. 6 illustrates a plan view of the superhydrophobic layer 50 including the channels 52 that are operatively connected to one or more water collecting components 56 via one or more conduits or pathways 54. The one or more water collecting components 56 may include a liquid impermeable compartment housing a water absorbing material 58 disposed therein. The liquid impermeable compartment may be provided in a variety of forms, such as pods, bags, bands for encircling a user's appendage. FIG. 7 shows a side view of the superhydrophobic layer 50 including ridges 51, in which the superhydrophobic layer and the ridges define the channels 52 that channel condensed water across the surface of the superhydrophobic layer.

Figure 8:
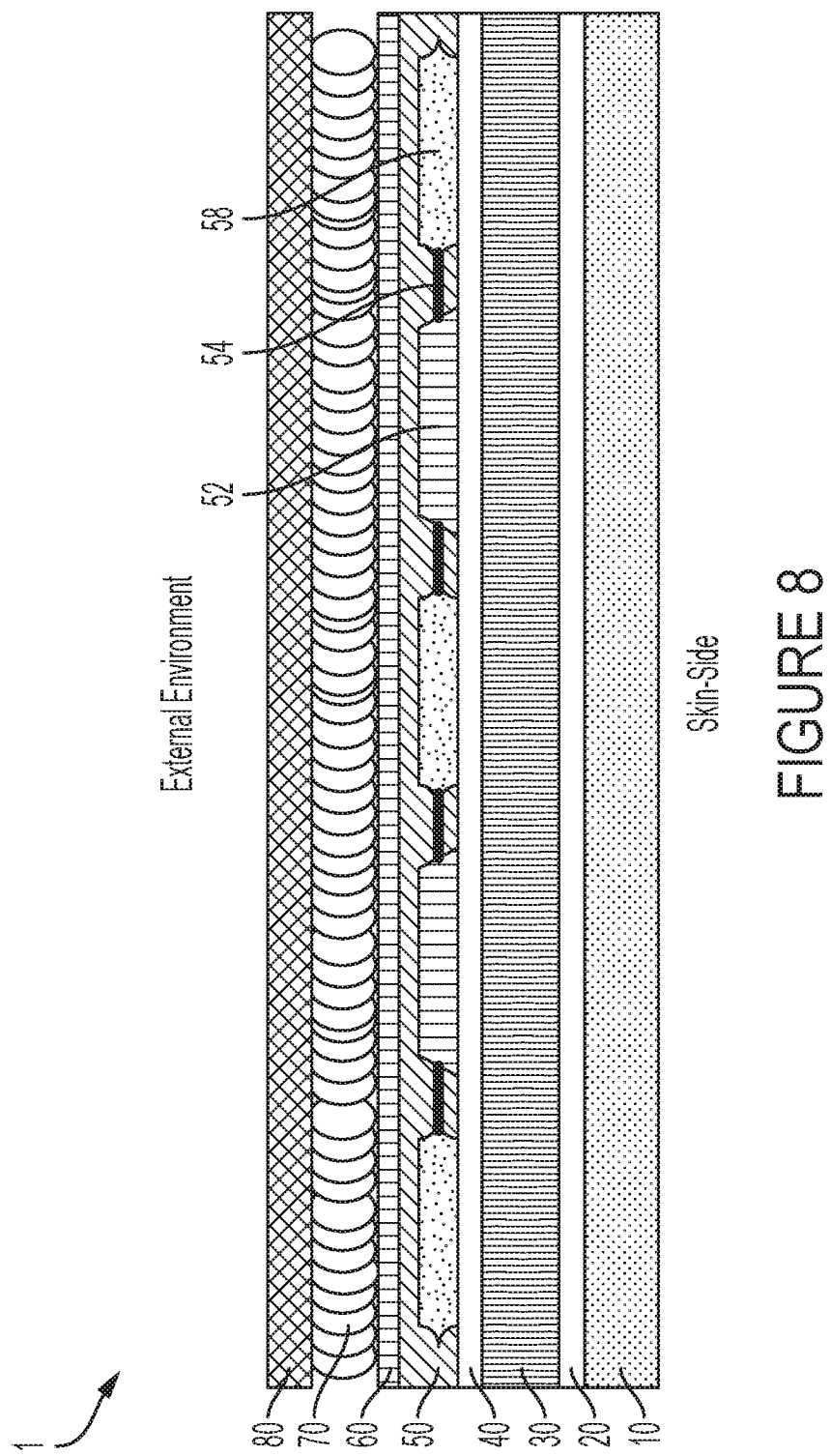
FIG. 8 illustrates another article in which the water collecting components are located between the superhydrophobic layer and the insulating layer in accordance with certain embodiments of the invention.

FIG. 8 illustrates another example embodiment in which the water collecting components 56 are located between the superhydrophobic layer 50 and the insulating layer 30. In the example embodiment shown in FIG. 5, the superhydrophobic layer 50 includes a plurality of channels 52 connected via connecting pathways 54 to the water absorbing material 58 housed in one or more water collecting components 56.

Figure 9:
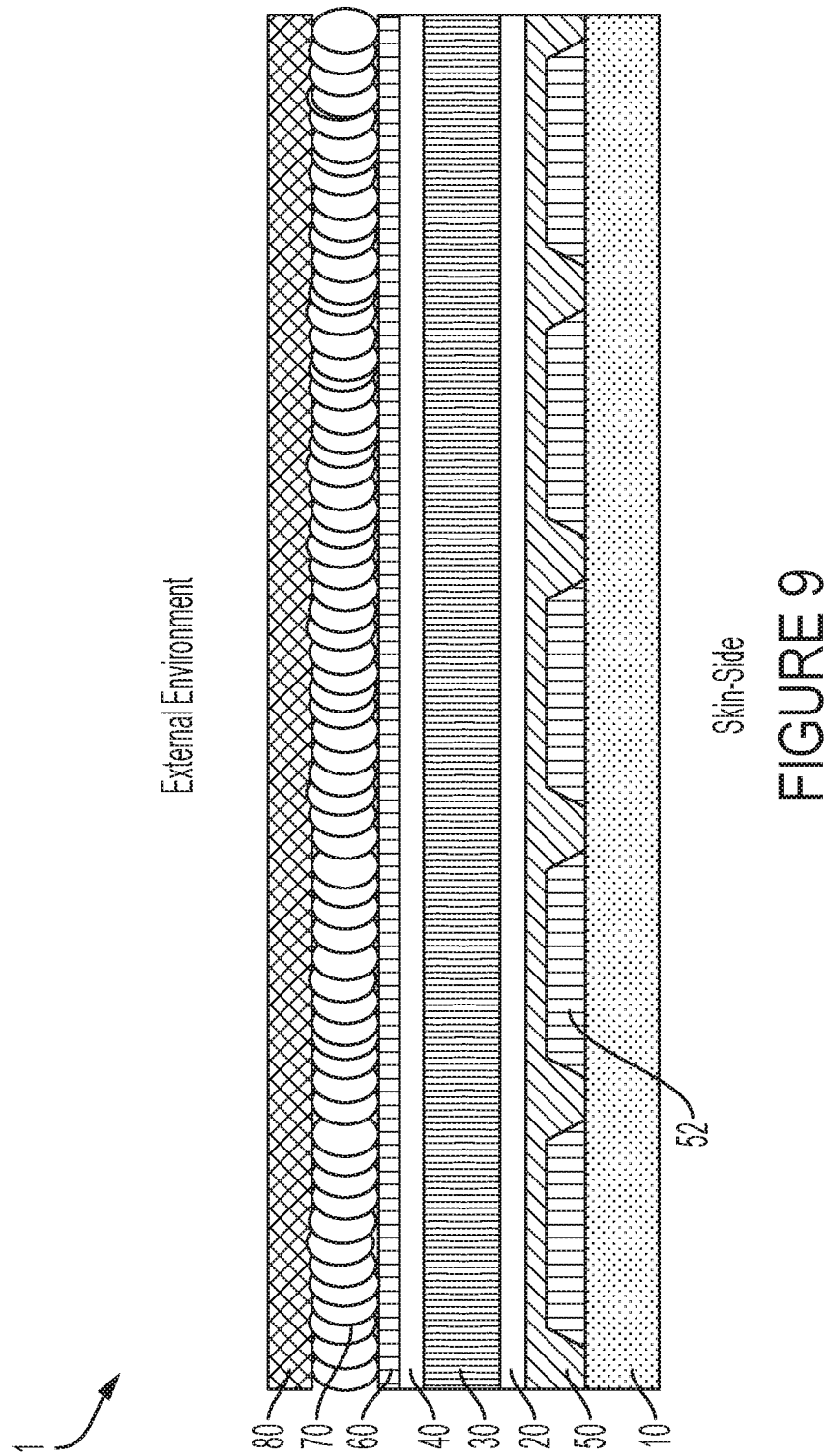
FIG. 9 illustrates another article in which the superhydrophobic layer is located between the wicking layer and the insulating layer in accordance with certain embodiments of the invention.
Figure 10:
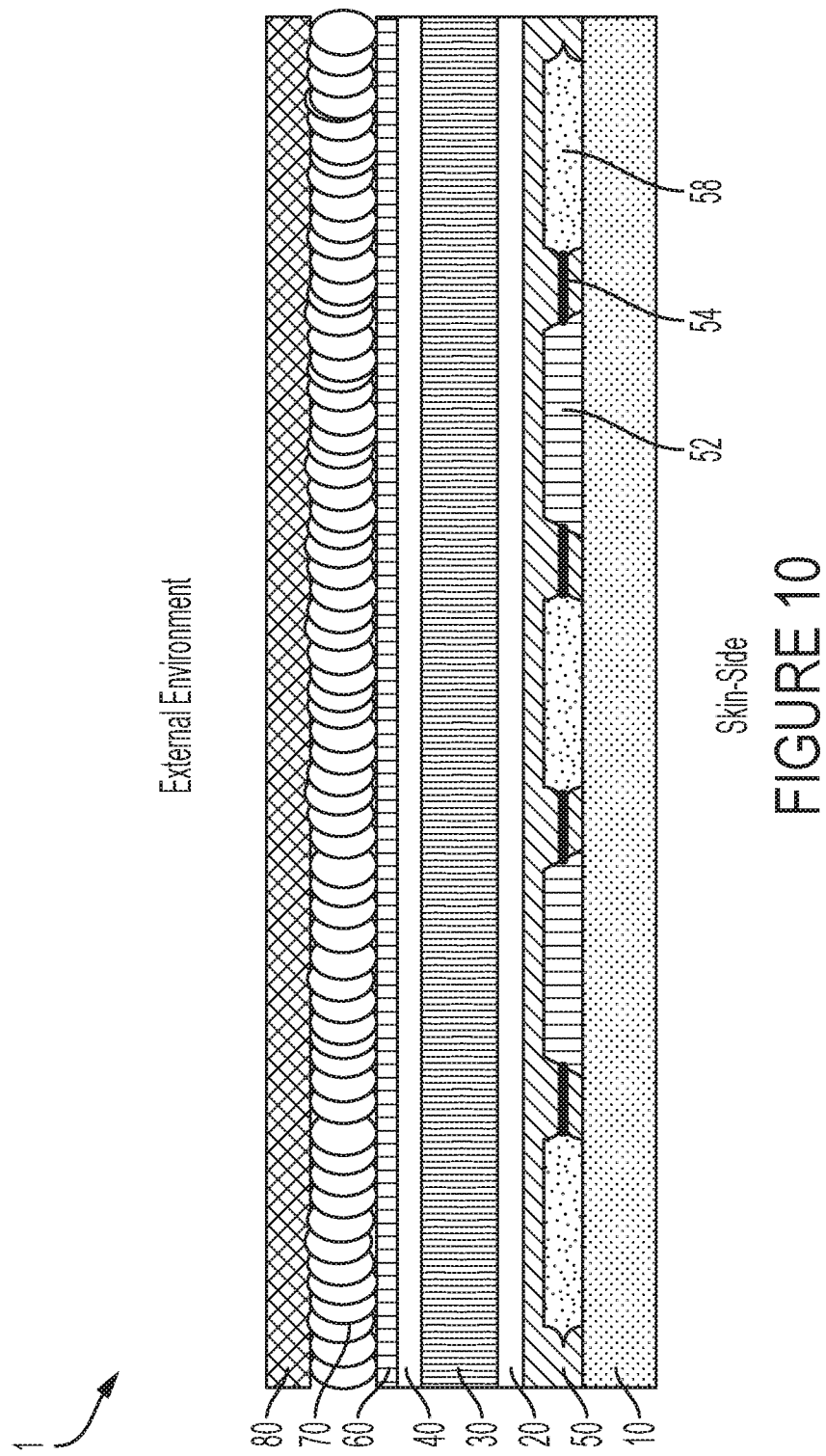
FIG. 10 illustrates another article in which the superhydrophobic layer is located between the wicking layer and the insulating layer.

FIG. 9 illustrates another example embodiment in which the superhydrophobic layer 50 is located between the wicking layer 10 and the insulating layer 30. Additionally or alternatively, the article may include a vapor-permeable liquid barrier layer located between the wicking layer 10 and the superhydrophobic layer 50. FIG. 9 also shows an example embodiment including optional channels 52 as discussed above. FIG. 10 illustrates another embodiment in which the superhydrophobic layer 50 is located between the wicking layer 10 and the insulating layer 30. Additionally or alternatively, the article may include a vapor-permeable liquid barrier layer located between the wicking layer 10 and the superhydrophobic layer 50. As shown in FIG. 10, the article may include the water collecting components 56 including water absorbing material 58 located between the superhydrophobic layer 50 and the wicking layer 10. Alternatively, the flexible vapor permeable liquid barrier may be directly sandwiched between the wicking layer and the superhydrophobic layer. As illustrated by FIG. 10, the water collecting components 56 including water absorbing material 58 may be connected to channels 52 via connecting pathways 54.

In accordance with certain embodiments of the invention, one or more of the individual layers of the article may be directly or indirectly attached or bonded together to provide a unitary structure. In accordance with certain embodiments of the invention, one or more of the individual layers may be releasably connected such that one or more of the individual layer may be removed and or substituted with a replacement layer of interest. In accordance with certain embodiments of the invention, one or more of the individual layers may be attached together via stitching, adhesively bonded, or any combination thereof.

In accordance with certain embodiments of the invention, the article may be provided in a variety of forms, such as a flexible wearable article. For example, the article may include a glove with individual fingers, a mitten, a dry suit, a mask, a hood, a shirt, a jacket, a pair of pants, footwear, or an underwater diving suit (or portion thereof).

The invention also provides an insulating system comprising a plurality of layers. In accordance with certain embodiments of the invention, the insulating system includes a wicking layer, an incompressible insulation layer, and a water scavenging system comprising a superhydrophobic layer in operative communication with one or more water collecting components. The insulating system may also include one or more fleece layers and/or one or more vapor permeable liquid barrier layer as described and disclosed herein. The insulation system may be provided in a flexible or rigid form for application to inanimate objects or movable objects or users.

In another aspect, the invention provides a method of forming an insulating article, such as any of those described and disclosed herein. The method may include providing or forming a wicking layer, directly or indirectly overlying the wicking layer with an incompressible insulation layer. The method may also include providing or forming a water scavenging system comprising a superhydrophobic layer in operative communication with one or more water collecting components.

EXAMPLES

The present disclosure is further illustrated by then following examples, which in no way should be construed as being limiting. That is, the specific features described in the following examples are merely illustrative and not limiting.

Example 1

Figure 11A:
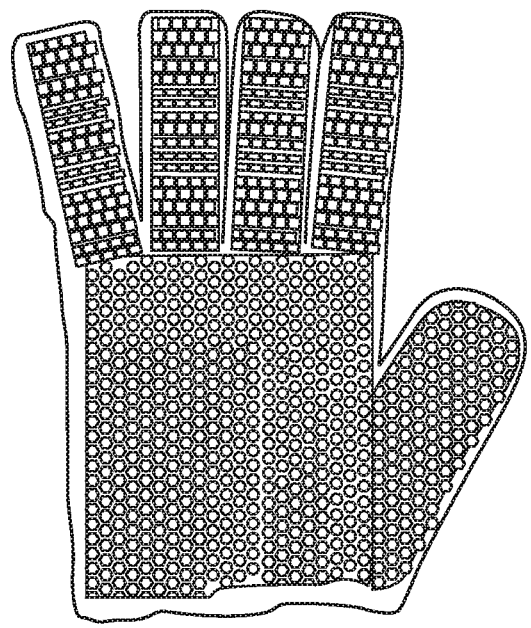
FIG. 11A-11C show an incompressible insulation layer of a glove in accordance with certain embodiments of the invention.
Figure 11B:
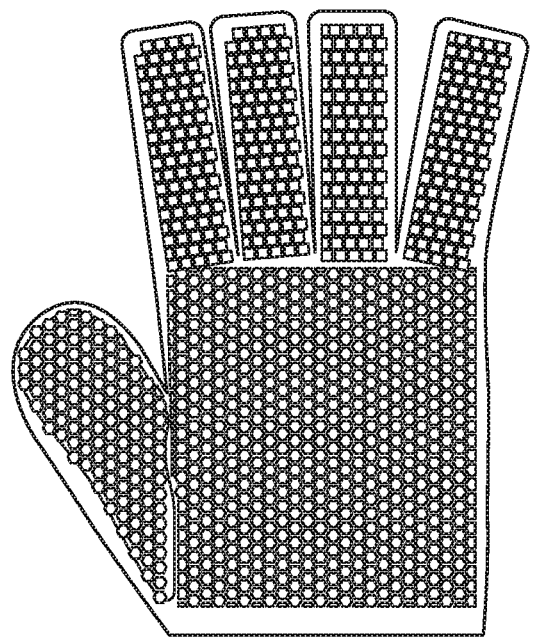
Figure 11C:
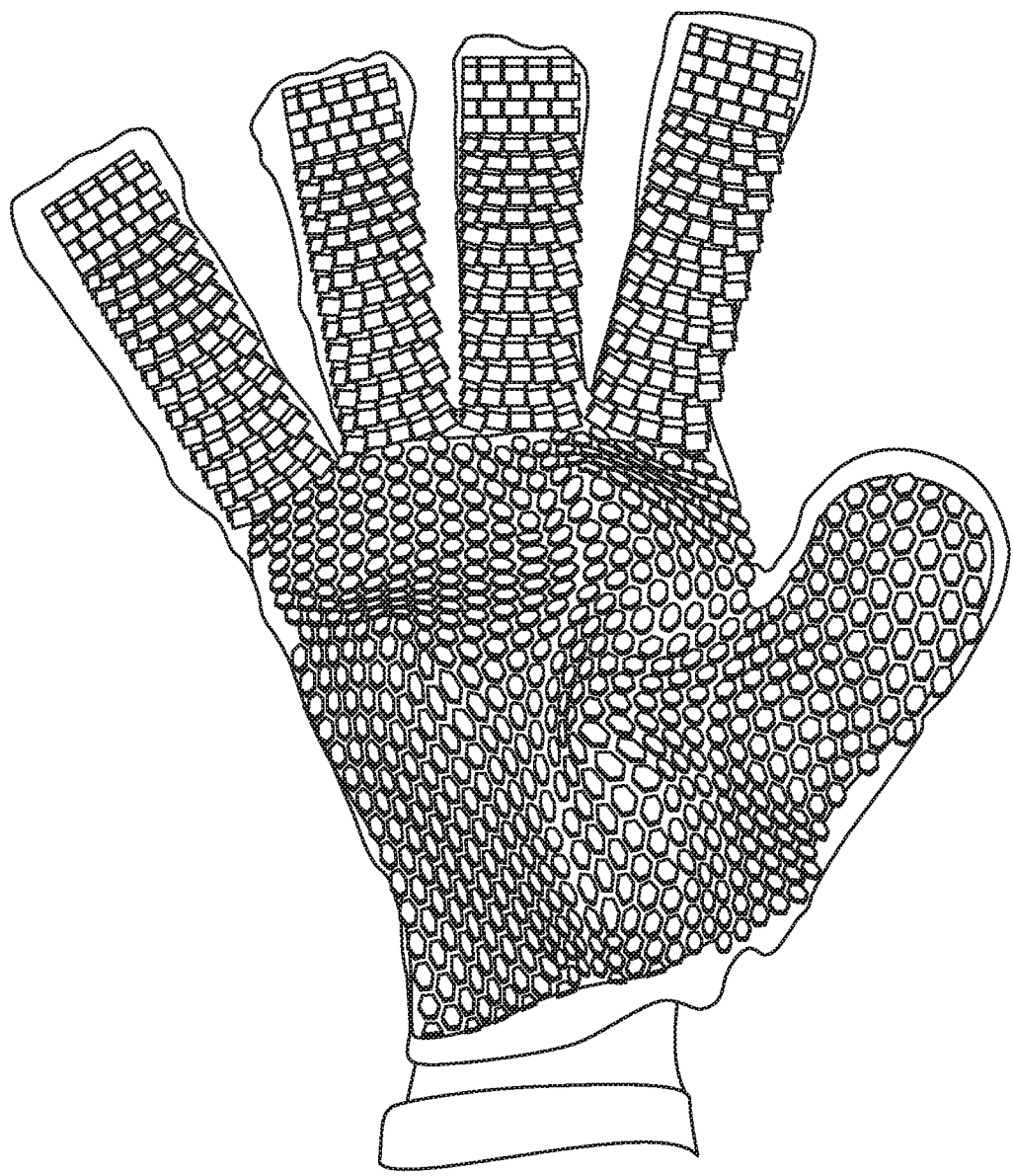

An article in the form of a five-fingered glove (i.e., example glove) was constructed in accordance with certain embodiments of the invention. The five fingers and palm were manufactured separately and were joined together using both polyisobutylene adhesive and thread. The palm portion of the incompressible insulation layer of the glove is shown in FIG. 11A. FIG. 11B shows a dorsal view of the incompressible insulation layer of the glove, while FIG. 11C shows the glove of FIGS. 11A-B fitted onto a user's hand.

This example glove included four (4) distinct layers. From outside to inside, the glove included a waterproof layer, semipermeable layer, insulating layer (i.e., the incompressible insulation layer), and sweat wicking layer. The waterproof layer of the glove included an outer fleece lining and an inner superhydrophobic lining. The semipermeable layer allowed water vapor to pass, but not liquid water. The individually tiled aerogel components provided insulation, while the sweat wicking layer is placed in contact with the skin of a user. This example glove had a modular design that makes it possible to modify the individual components/layers without having to fabricate an entirely new glove.

This example glove was compared to the Si-Tech Showa glove with a THINSULATE® liner (i.e., the control). Four tests were performed on the example glove and the control. The thermal resistance was measured in air at 17° C. and in water at 0° C. The two conditions were then repeated while a hand manikin was allowed to sweat at a rate of 10 g/m²-min.

Figure 12:
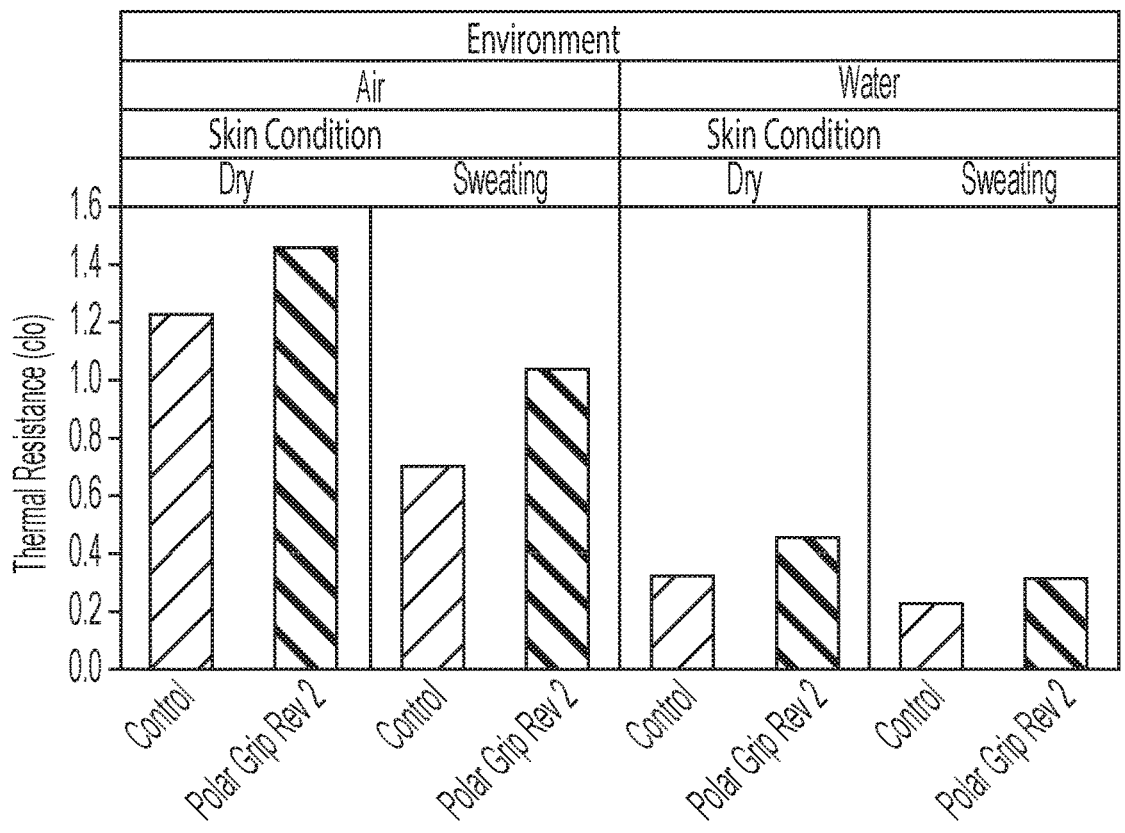
FIG. 12 shows certain test results for a glove in accordance with certain embodiments compared to a control.

The example glove in accordance with certain embodiments of the invention was significantly better than the control as shown in FIG. 12. The example glove had a thermal resistance of 1.5 in air, and it dropped to 0.45 when immersed in 0° C. water. The control had a thermal resistance of 1.2 in air and 0.3 in water, for comparison.

The effects of sweating were mixed. The test performed in air showed that the sweat scavenging liner of example glove mitigated heat losses due to sweat. The control was very sensitive to moisture inside the glove as its thermal resistance dropped to nearly one half of its dry value. The example glove retained about 70% of its dry thermal resistance in the presence of sweat. When immersed in water, the example glove and the control had a thermal resistance of 0.31 and 0.23, respectively. The thermal resistance was lower than usual, because the condensation of water along the outer layer of rubber was a major source of heat loss for both gloves.

The more rapid heat loss when sweating is a feature rather than a bug. For example, it shows that the example glove will allow the hand of a user to cool if the diver is overheated, but once the sweat scavenging mechanism desiccates the inside of the glove, the thermal resistance should increase back to its dry value. The control, in contrast, will saturate with water, eventually rendering the insulation ineffective.

Figure 13:
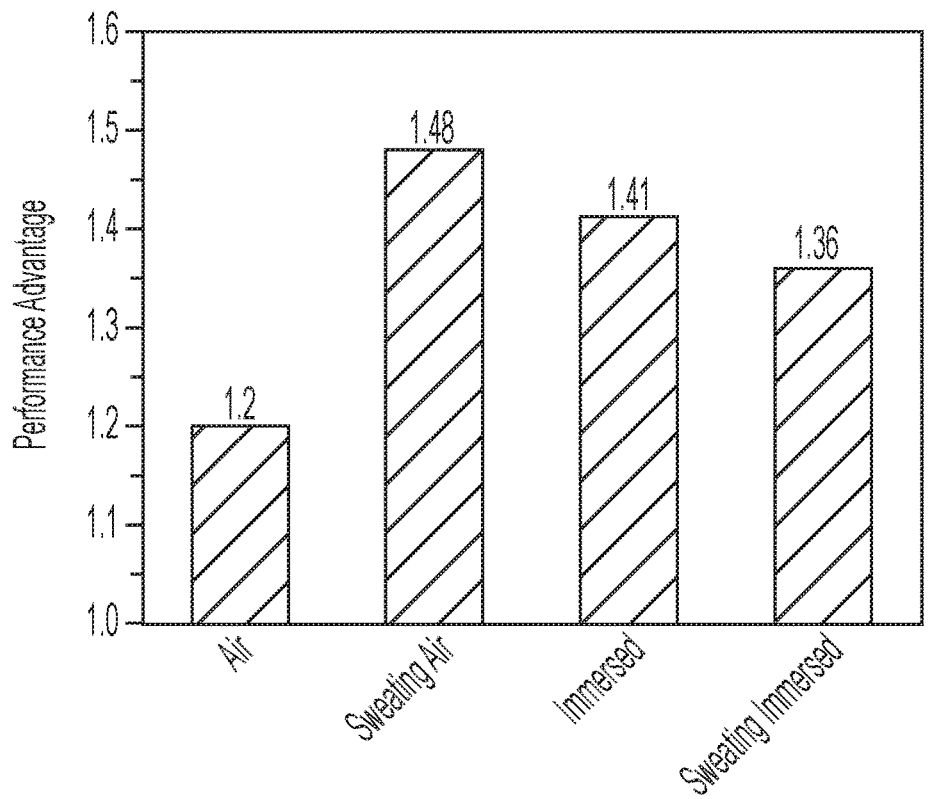
FIG. 13 shows the thermal resistance of a glove in accordance with certain embodiments of the invention normalized by that of a control.

FIG. 13 shows the thermal resistance of the example glove normalized by that of the control. The example glove is 8% thinner and 15% lighter than the control, but its performance advantage ranged from 1.2 to 1.5. The results can be rationalized as follows. The 20% improvement in air is a smaller than expected, because the aerogel is about 40% more efficient than THINSULATE® for the same thickness. Note, then, that the prototype is almost exactly 40% better when immersed in water. What appears to be happening, then, is that submerging the control glove in water is squeezing out trapped air. The loose fit of the control makes it appear to perform better in air than it should. The performance in water is therefore a better comparison.

Both gloves are similar in thickness, so the better performance of the example glove comes almost entirely from the lower thermal conductivity of the aerogel. Note that this performance advantage will increase with increasing depth because the aerogel is incompressible. It is expected to increase by a factor of 4 at 100 ft. depth, where the pressure is 4× greater than at sea level. The THINSULATE® in the control will compress to one-quarter its original thickness, whereas the example glove thickness will remain constant.

Lastly, the effects of sweating on thermal resistance were studied. In air, the sweat scavenging mechanism of the example glove appears to improve the performance advantage of example glove relative to dry conditions. One could explain the widening gap with the control by noting that the THINSULATE® is absorbing water. The water-logged fabric will inevitably become a poor insulator as it saturates with sweat. Interestingly, the performance advantage shrinks in 0° C. water. Most likely, the discrepancy is due to the much greater rate of condensation at 0° C. in water versus 17° C. in air. Condensation transfers a huge amount of heat due to the large latent heat of vaporization. As condensation begins to dominate the other heat loss mechanisms, the performance of the two gloves will tend to equalize.

To simulate sweating, the hand manikin released water at a rate of 10 g/m²-min. A fabric glove ensured an even distribution across the entire area of the hand. We placed the example glove on the manikin and collected water for 30 minutes. The experiment was performed in 17° C. air or 0° C. water. In the first test, 54% of the water was absorbed by the reservoir (e.g., one or more water collecting components), and 45% was absorbed by the other parts of the glove. Note that the glove was dry at the beginning of this test. Less than 1% of the sweat remained on the hand, meaning that the glove removed sweat with 99% efficiency. In the second experiment performed in 0° C. water, 86% of the moisture was absorbed by the reservoir (e.g., one or more water collecting components), versus 14% in the rest of the glove. For this experiment, the other components were damp to begin with, suggesting that they were nearly saturated at the beginning of the experiment. Notably, 100% of the water was captured by the glove. The 86% captured by the reservoir (e.g., one or more water collecting components), would be simple to remove and dry.

Example 2

Figure 14:
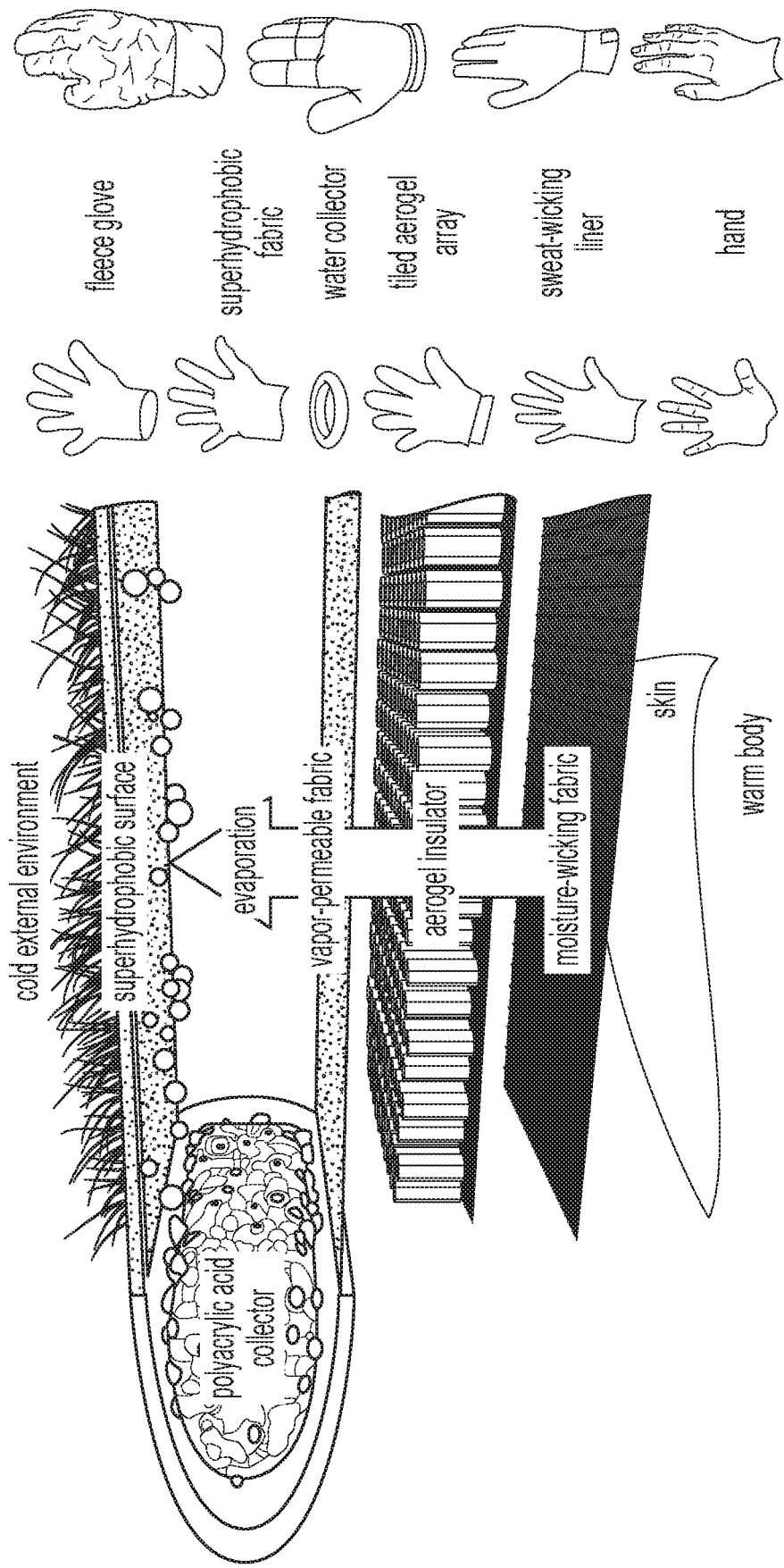
FIG. 14 shows a schematic of an example glove including four separable components, in which the one or more water collecting components has been separated from the semi-permeable layer and is worn around the wrist of the incompressible insulation layer.

An additional example glove was constructed and is schematically illustrated in FIG. 14. For this example glove, the aerogel tiles on the inside of each finger have a greater taper to facilitate bending. The aerogel tiles near the top of the palm are rectangular rather than hexagonal to facilitate bending. The fingers are shorter relative to the palm, so that the most highly tapered tiles have better registry with the knuckles. The individually tiled polymer aerogel components are adhered to an elastic fabric comprising polyisobutylene to achieve improved adhesion to the aerogel tiles. The example glove also features a vapor-permeable liquid barrier layer that is integrated with the incompressible insulation layer, and it doubles as a protective fabric for the polymer aerogel tiles. The vapor-permeable liquid barrier layer including a 40 denier nylon fabric that was shown to absorb the smallest mass of water when saturated. The water collecting components (e.g., reservoir) of the water scavenging system was separated from the vapor-permeable liquid barrier layer, and us worn as a band over the wrist between the insulating layer and the outermost liquid impermeable layer (e.g., rubber layer or shell). The fibrous fleece layer may include a polypropylene fleece including 3 mm long chopped fibers to achieve a greater fiber density.

This example glove combined the features of using an incompressible insulator (e.g., an incompressible insulation layer), capturing sweat as condensation from the interior of the waterproof shell, and reducing radiative heat loss via a fibrous surface. The incompressible insulator insulated 1.5-2× better than a THINSULATE® glove at sea level. Since THINSULATE® is primarily filled with air, the aerogel insulator could therefore insulate 6-8× better at a depth of 100 ft., where the pressure is 4× higher than at sea level.

The a water scavenging system also provides several benefits. Until now, sweat has only been removed from winter gear by allowing it to evaporate through the clothing. Such gear often relies on a semipermeable membrane of expanded TEFLON® (e.g., GORE-TEX®), which has small pores that allow water vapor to pass, but do not allow liquid water from rain or melted snow to enter from the outside. This example glove's method of scavenging water that condenses on the inside of the waterproof shell is ideal, particularly for underwater diving applications in which internally generated water vapor from sweat cannot escape through the article and into an external environment (e.g., a body of water).

The fabric-backed aerogel was machined into tiles a plurality of individually tiled polymer aerogel components that were adhered to an elastic fabric. The elastic fabric backing was trimmed to fit a large glove size for an adult male. The five fingers were attached to the palm and dorsal sections with waterproof fabric tape. Next, a 40 denier nylon fabric was cut to the same shape as the aerogel backed fabric. Including the front and back of the glove, the four layers were then stitched by hand around the perimeter in order to create a robust insulating layer with a protective outer fabric. The five fingers, palm, and dorsal sections were attached with fabric tape and trimmed. A protective layer of fabric was then placed over the exposed aerogel tiles and the glove was then sewn together.

The next step of fabrication was to spray the superhydrophobic coating on the outside of the protective fabric. The goal is to allow water vapor to pass out from the hand through the fabric, yet prevent condensed water on the waterproof shell from returning. It acts as a one-way valve to remove moisture from the hand. The superhydrophobic coating was also applied to the inside of a butyl rubber glove that serves as the waterproof shell.

The coating was applied by first spraying an adhesive layer of polyisobutylene from hexane solution, and then spraying a second layer of TEFLON® nanoparticles from a hexane suspension. The result was a superhydrophobic surface with roughness at two length scales. The 10-100 nm roughness of the particles prevents intimate contact of the water with the surface due to the high Laplace pressure of infiltration. The 10-50 µm roughness of the particle aggregates creates a tortuous three-phase contact line that destabilizes the droplets and makes it difficult for them to come to rest.

Figure 15:
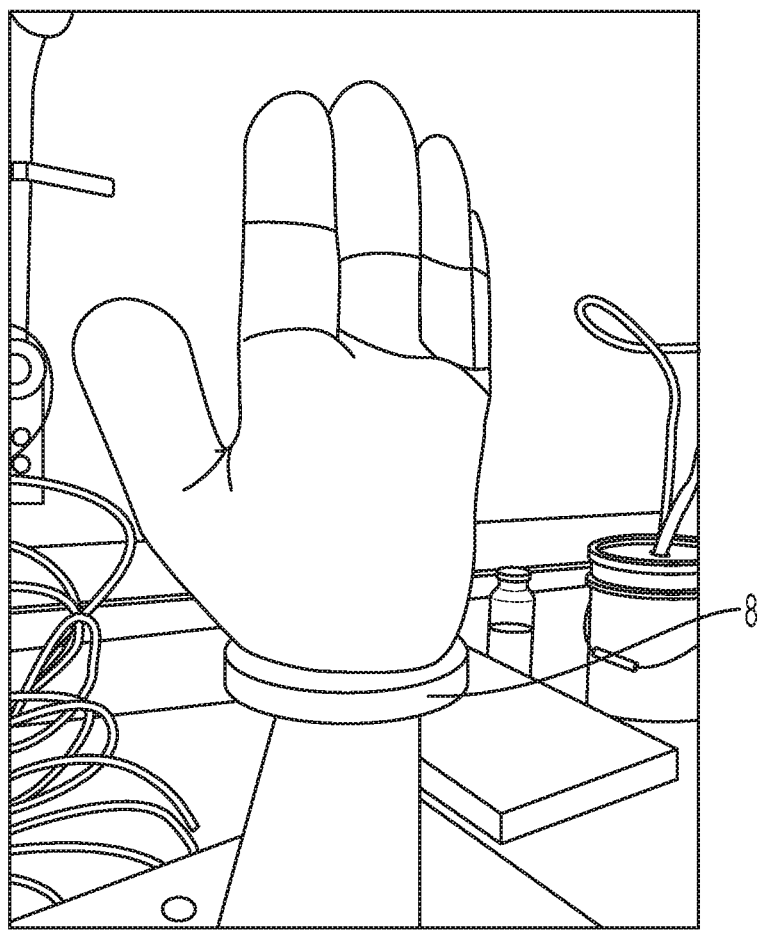
FIG. 15 shows a separable moisture collecting wristband in accordance with certain embodiments of the invention.

Since the outside of the semipermeable layer (e.g., vapor-permeable liquid barrier layer) and inside of the waterproof shell are both superhydrophobic, the condensed water droplets roll freely under the influence of gravity. The droplets will continue to roll and coalesce until they come into contact with the polyacrylic acid contained with the water collecting components, which is worn as a band around the wrist for this example glove. The separable moisture collecting wristband 8 is shown in FIG. 15. As shown in FIG. 15, the separable moisture collecting wristband 8 is shown as a small black band that is affixed with Velcro and buttons to the outside of the insulating layer (e.g., the incompressible insulation layer). Since the moisture it collects is essentially distilled water, the collector can be reused if desired.

Lastly, the short fiber fleece was applied to the outside of the butyl rubber glove again using polyisobutylene adhesive. The fibers are packed densely to the surface in order to add as little thickness as possible.

Figure 16:
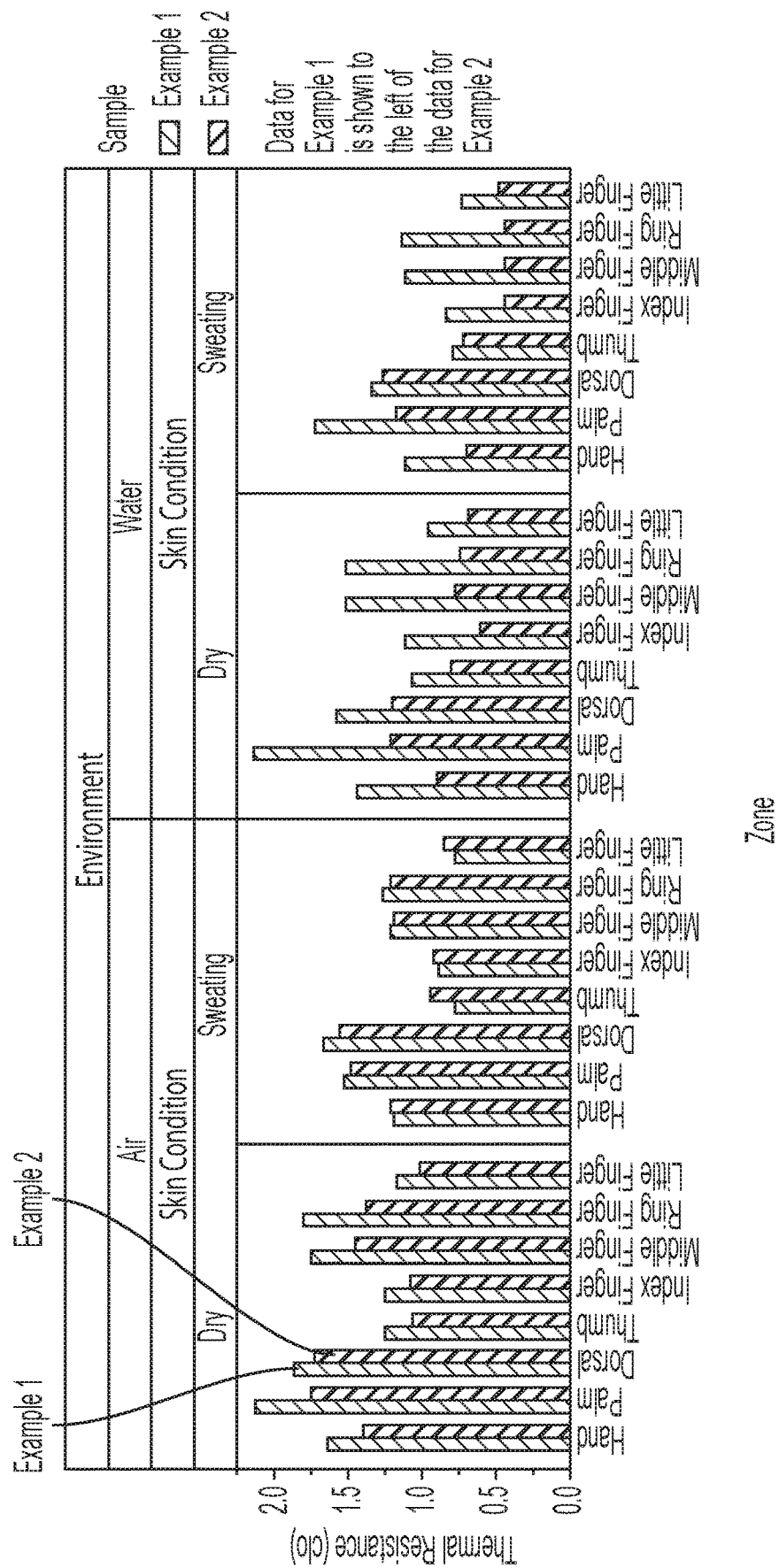
FIG. 16 shows sources of heat loss for different zones in Examples 1 and 2 in accordance with certain embodiments of the invention.

Inspection of the different zones in FIG. 16 shows that the largest sources of heat loss in going from the Example 1 to Example 2 came from the palm, middle finger, and ring finger. The difference in the palm can be explained by the fact that it does not buckle as severely in the example glove of Example 2. The example glove of Example 1 was too wide, and the pose of the manikin caused a large buckle at the midpoint. The width of the individually tiled polymer aerogel components was trimmed near the wrist of the example glove of Example 2, leading to a greatly improved fit. Buckling is clearly undesirable from a fitting standpoint, but the resulting air-gap leads to anomalously high values of thermal resistance.

The middle and ring fingers are also victims of the better fit. The fit of the example glove of Example 1 was extremely tight, so extra fabric was left on each side of the polymer aerogel tiles during the construction of the glove. The looser fit is one of the main reasons why the example glove of Example 2 makes is so much easier to make a fist when worn. Unfortunately, the sides of the fingers are free of insulation, and a major source of heat loss. It may be desirable to extend the width of the aerogel insulation.

In terms of moisture collection, the primary goal was to limit the amount of moisture that remained trapped within the semipermeable layer (e.g., the vapor-permeable liquid barrier layer) and divert as much of it as possible to the moisture collector on the wrist since the accumulation of thermally conductive water in the semipermeable fabric reduces the thermal resistance.

Similar to Example 1, moisture collection was tested by setting the sweating rate to 600 L/m$^2$-hr, the average maximum sweat rate for an adult male. The test was performed under two conditions, in 22° C. air and 0° C. water. This example glove captured water with a highest efficiency. Efficiency is defined as leaving the smallest quantity of water on the hand. In particular, this example glove succeeded in diverting a greater proportion of water to the moisture collector. In in 22° C. air, 88% of the water was found in the water collector with 12% found in the incompressible insulation layer. In 0° C. water, 22% of the water was found in the water collector, 21% located at the hand, and the rest was located in other components of the example glove.

These and other modifications and variations to embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. An article, comprising:
a wicking layer;
an incompressible insulation layer;
a water scavenging system comprising (i) a superhydrophobic layer including one or more channels, (ii) one or more conduits, and (iii) one or more water collecting components;
wherein the one or more channels is in operative liquid communication with the one or more water collecting components via the one or more conduits; and
an exterior fibrous fleece;
wherein wicking layer and the external fibrous fleece define an interior space therebetween, and wherein the one or more water collecting components is located externally from the interior space.

2. The article of claim 1, wherein the wicking layer comprises:
an innermost layer of the article; and
a fabric.

3. The article of claim 1, wherein the incompressible insulation layer comprises at least one layer of individually tiled aerogel components that are adhered to at least one flexible substrate.

4. The article of claim 1, wherein
the incompressible insulation layer is directly sandwiched between a first flexible substrate and a second flexible substrate, and
wherein at least one of the first flexible substrate or the second flexible substrate comprise a vapor-permeable liquid barrier layer.

5. The article of claim 1, wherein the incompressible insulation layer comprises at least one layer of individually tiled aerogel components having an average thickness from about 0.1 mm to about 2 mm.

6. The article of claim 5, wherein the at least one layer of individually tiled aerogel components includes a first individual aerogel component having a side edges perpendicular to a first outer surface of the first individual aerogel component and a second outer surface of the first individual aerogel component, and a second individual aerogel component having one or more side edges angled from a first outer surface of the second individual aerogel component to a second outer surface of the second individual aerogel component.

7. The article of claim 1, wherein the incompressible insulation layer comprises at least one layer of individually tiled aerogel components comprising a polymer aerogel.

8. The article of claim 4, wherein the first flexible substrate comprises a vapor-permeable liquid barrier layer comprising a hydrophilic fabric, a microporous film, a monolithic film, or any combination thereof.

9. The article of claim 8, wherein the vapor-permeable liquid barrier layer comprises a fabric of a stretched polytetrafluoroethylene (PTFE).

10. The article of claim 1, wherein the superhydrophobic layer of the water scavenging system comprises a superhydrophobic coating on a water impermeable substrate.

11. The article of claim 10, wherein the water impermeable substrate comprises a flexible rubber.

12. The article of claim 1,
wherein the one or more water collecting components are configured to be worn around an appendage of a user.

13. The article of claim 1, wherein the one or more water collecting components comprise a water absorbing material comprising a superabsorbent polymer, hydrogel, or any combination thereof.

14. The article of claim 13, wherein the water absorbing material comprises a polyacrylic acid.

15. The article of claim 1, further comprising a fleece layer, wherein the incompressible insulation layer is disposed between the fleece layer and the wicking layer.

16. An insulating system, comprising:
a wicking layer;
an incompressible insulation layer;
a water scavenging system comprising (i) a superhydrophobic layer including one or more channels, (ii) one or more conduits, and (iii) one or more water collecting components;
wherein the one or more channels is in operative liquid communication with the one or more water collecting components via one or more conduits;
wherein at least the wicking layer and the incompressible insulation layer are loosely overlaid or releasably attached; and
a fibrous fleece;
wherein wicking layer and the external fibrous fleece define an interior space therebetween, and wherein the one or more water collecting components is located externally from the interior space.

17. A method of forming an insulating article, comprising:
providing or forming a wicking layer,
directly or indirectly overlying the wicking layer with an incompressible insulation layer; and
forming or providing a water scavenging system comprising (i) a superhydrophobic layer including one or more channels, (ii) one or more conduits, and (iii) one or more water collecting components; wherein the one or more channels is in liquid operative communication with the one or more water collecting components via one or more conduits;
wherein wicking layer and the external fibrous fleece define an interior space therebetween, and wherein the one or more water collecting components is located externally from the interior space.

18. The article of claim 1, wherein the one or more water collecting components comprises a reservoir configured to be directly or indirectly worn by a user, and wherein the one or more water collecting components are removably coupled to the superhydrophobic layer.

19. The article of claim 18, wherein the one or more water collecting components comprises is configured to be worn around a user's wrist, ankle, or waist.

* * * * *